(12) United States Patent
Nagai et al.

(10) Patent No.: US 11,472,320 B2
(45) Date of Patent: Oct. 18, 2022

(54) VEHICLE SEAT FOR SUPPORTING SEAT CUSHION WHILE PERMITTING LATERAL MOVEMENT

(71) Applicant: TOYOTA JIDOSHA KABUSHIKI KAISHA, Toyota (JP)

(72) Inventors: Tetsuya Nagai, Okazaki (JP); Kohshi Katoh, Toyota (JP); Takashi Sugimoto, Anjyo (JP); Osamu Oda, Toyota (JP); Ryunosuke Seki, Shizuoka (JP); Kenji Iida, Numazu (JP); Akira Takinami, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 16/796,485

(22) Filed: Feb. 20, 2020

(65) Prior Publication Data
US 2020/0269735 A1    Aug. 27, 2020

(30) Foreign Application Priority Data

Feb. 26, 2019 (JP) .............................. JP2019-033162
Aug. 28, 2019 (JP) .............................. JP2019-155694

(51) Int. Cl.
*B60N 2/54* (2006.01)
(52) U.S. Cl.
CPC .................................... *B60N 2/546* (2013.01)
(58) Field of Classification Search
CPC ............ B60N 2002/0208; B60N 2/062; B60N 2/546; B60N 2/06

USPC .......................................................... 297/314
See application file for complete search history.

(56) References Cited

U.S. PATENT DOCUMENTS

| | | | | |
|---|---|---|---|---|
| 2,568,832 | A * | 9/1951 | Stone ..................... | B60N 2/544 297/285 |
| 2,638,965 | A * | 5/1953 | Woodin ................. | B60N 2/546 248/580 |
| 8,662,585 | B2 * | 3/2014 | Garvis .................... | G09B 9/12 297/344.17 |
| 9,975,458 | B2 * | 5/2018 | Takeuchi ................. | B60N 2/39 |
| 2002/0145321 | A1 | 10/2002 | Brightbill et al. | |
| 2008/0084100 | A1 | 4/2008 | Curiger | |
| 2014/0225407 | A1 | 8/2014 | Nagayasu | |

(Continued)

FOREIGN PATENT DOCUMENTS

| | | |
|---|---|---|
| CN | 103978918 A | 8/2014 |
| DE | 102017208601 A1 * | 11/2018 |

(Continued)

*Primary Examiner* — Milton Nelson, Jr.
(74) *Attorney, Agent, or Firm* — Hunton Andrews Kurth LLP

(57) ABSTRACT

In the vehicle seat, rear suspension members are provided at two positions spaced away from each other in a lateral direction on an edge of a seat cushion near a seatback, and support the seat cushion while the seat cushion is suspended from a seat cushion support frame so that the seat cushion is movable in the lateral direction. A front suspension member is provided at one position or two positions spaced away from each other in the lateral direction on ahead of the rear suspension members, and supports the seat cushion while the seat cushion is suspended from the seat cushion support frame so that the seat cushion is movable in the lateral direction.

13 Claims, 16 Drawing Sheets

(56) References Cited

U.S. PATENT DOCUMENTS

| | | | | |
|---|---|---|---|---|
| 2015/0352981 A1* | 12/2015 | Nagayasu | ................ | B60N 2/68 |
| | | | | 297/313 |
| 2016/0355238 A1 | 12/2016 | Charleston | | |
| 2018/0022238 A1* | 1/2018 | Gonzalez Uribe | .. | B60N 2/7094 |
| | | | | 297/325 |
| 2018/0072187 A1 | 3/2018 | Katoh et al. | | |

FOREIGN PATENT DOCUMENTS

| | | | | | |
|---|---|---|---|---|---|
| GB | 2465877 A | * | 6/2010 | ............... | B60N 2/04 |
| JP | H3088850 U | | 9/1991 | | |
| JP | 2008093447 A | | 4/2008 | | |
| JP | 2015-024680 A | | 2/2015 | | |
| JP | 2015-229442 A | | 12/2015 | | |
| JP | 6036364 B2 | | 11/2016 | | |
| JP | 2018043671 A | | 3/2018 | | |
| WO | WO-2007128367 A1 | * | 11/2007 | ............... | B60N 2/04 |

\* cited by examiner

VEHICLE SEAT FOR SUPPORTING SEAT CUSHION WHILE PERMITTING LATERAL MOVEMENT

INCORPORATION BY REFERENCE

The disclosure of Japanese Patent Application No. 2019-033162 filed on Feb. 26, 2019 and Japanese Patent Application No. 2019-155694 filed on Aug. 28, 2019, including the specification, drawings and abstract are incorporated herein by reference in their entirety.

BACKGROUND

1. Technical Field

The present disclosure relates to a vehicle seat, and more particularly, to a seat cushion.

2. Description of Related Art

There is known a vehicle seat in which lateral movement of a seat cushion relative to a frame of the vehicle seat is permitted. For example, Japanese Unexamined Patent Application Publication No. 2015-229442 (JP 2015-229442 A) describes a movable cushion 18 supported on a seat cushion frame 16 via leaf springs 26. The leaf spring 26 extends rearward from the front end of the seat cushion frame 16, and supports the movable cushion 18 at the rear end. The movable cushion 18 is movable in a lateral direction through deflection of the leaf spring 26. The leaf spring 26 functions as a beam that supports the movable cushion 18 in a cantilever manner. The reference symbols described above are used in JP 2015-229442 A, and are not related to reference symbols to be used in the description of an embodiment herein.

SUMMARY

In JP 2015-229442 A, the weight of a seated occupant or the like acts as a bending load on the leaf spring that supports the movable cushion in a cantilever manner. It is necessary to increase the stiffness of the leaf spring in order to bear the bending load. When the stiffness of the leaf spring is increased, lateral movement of the movable cushion is restricted.

The present disclosure provides a simple support structure that supports a seat cushion while permitting lateral movement.

One aspect of the present disclosure relates to a vehicle seat. The vehicle seat includes a seat cushion, a seatback, a seat cushion support frame, rear suspension members, and a front suspension member. The seat cushion supports a hip and thighs of a seated person. The seatback supports an upper body of the seated person from a rear. The seat cushion support frame is stationarily or slidably attached to a vehicle body. The rear suspension members are provided at two positions spaced away from each other in a lateral direction on an edge of the seat cushion near the seatback. The rear suspension members support the seat cushion while the seat cushion is suspended from the seat cushion support frame so that the seat cushion is movable in the lateral direction. The front suspension member is provided at one position or at each of two positions spaced away from each other in the lateral direction on ahead of the rear suspension members. The front suspension member supports or the front suspension members support the seat cushion while the seat cushion is suspended from the seat cushion support frame so that the seat cushion is movable in the lateral direction.

By supporting the seat cushion in a suspended manner, a bending load acting on the suspension member can be reduced, and the stiffness of the suspension member can be reduced.

In the aspect described above, a distance between upper ends of the suspension members may be smaller than a distance between lower ends of the rear suspension members. Thus, the seat cushion pivots. When the seat cushion moves rightward, the seat cushion is tilted so that the right edge is higher. When the seat cushion moves leftward, the seat cushion is tilted so that the left edge is higher.

In the aspect described above, the front suspension members may be provided at the two positions. According to this aspect, a load on one front suspension member is reduced as compared to a case where the front suspension member is provided at one position. Thus, the durability can be improved. When the front suspension member is provided at one position, it is necessary to arrange the front suspension member at the center. By providing the front suspension members at the two positions, the degree of freedom increases in terms of arrangement positions of the front suspension members.

In the aspect described above, the front suspension members may be provided at the two positions, and a distance between upper ends of the front suspension members may be smaller than a distance between lower ends of the front suspension members. Thus, the seat cushion pivots. When the seat cushion moves rightward, the seat cushion is tilted so that the right edge is higher. When the seat cushion moves leftward, the seat cushion is tilted so that the left edge is higher.

In the aspect described above, the front suspension member may be located at a center of the vehicle seat in the lateral direction.

In the aspect described above, the seat cushion support frame may include two side members located on right and left sides and a coupling bar that extends in the lateral direction and couples the side members. Upper ends of the rear suspension members may be fixed to the coupling bar.

In the aspect described above, the vehicle seat may further include a seatback support frame coupled to the seat cushion support frame. The seatback may be supported on the seatback support frame so as to be swingable in the lateral direction.

In the aspect described above, one of the rear suspension member and the front suspension member or each of the rear suspension member and the front suspension member may be a leaf spring. One end of the leaf spring may be fixed to a member on a seat cushion support frame side. Thus, the moved seat cushion can be returned by an elastic force of the leaf spring.

In the aspect described above, one of the rear suspension member and the front suspension member or each of the rear suspension member and the front suspension member may be a leaf spring. An upper end of the leaf spring may be fixed to a member on a seat cushion support frame side, and a lower end of the leaf spring may be fixed to a member on a seat cushion side. A ridge may be formed on a plate surface of the leaf spring so as to project from the plate surface and extend along a longitudinal direction of the leaf spring. A height of the ridge may gradually decrease from an upper end portion and a lower end portion toward a center in the longitudinal direction of the leaf spring. In the aspect described above, the ridge of the leaf spring may have two ridge lines extending in parallel along the longitudinal direction of the leaf spring.

In the aspect described above, each of the front suspension members may be a leaf spring in which an upper end is fixed to a member on a seat cushion support frame side and a lower end is fixed to a member on a seat cushion side. The upper end of the leaf spring may be located ahead of the lower end of the leaf spring. The leaf spring may have a C-shape open to a rear. A ridge may be formed on a plate surface of the leaf spring so as to project from the plate surface and extend along a longitudinal direction of the leaf spring. A height of the ridge may gradually decrease from an upper end portion and a lower end portion toward a center in the longitudinal direction of the leaf spring. The ridge may have two ridge lines extending in parallel along the longitudinal direction of the leaf spring. The height of the ridge may be larger on the ridge line located at a rear than the ridge line located at a front.

In the aspect described above, one of the rear suspension member and the front suspension member or each of the rear suspension member and the front suspension member may be a leaf spring. An upper end of the leaf spring may be fixed to a member on a seat cushion support frame side, and a lower end of the leaf spring may be fixed to a member on a seat cushion side. The leaf spring may have a thick portion that is provided at least at each end in a longitudinal direction of the leaf spring and the thick portion has a large dimension in a thickness direction at least in part in a width direction of the leaf spring. The dimension of the thick portion in the thickness direction may gradually decrease from the end toward a center in the longitudinal direction of the leaf spring.

In the aspect described above, the leaf spring may be made of a fiber reinforced resin.

The bending load acting on the suspension member can be reduced, and the support structure for the seat cushion can be simplified.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
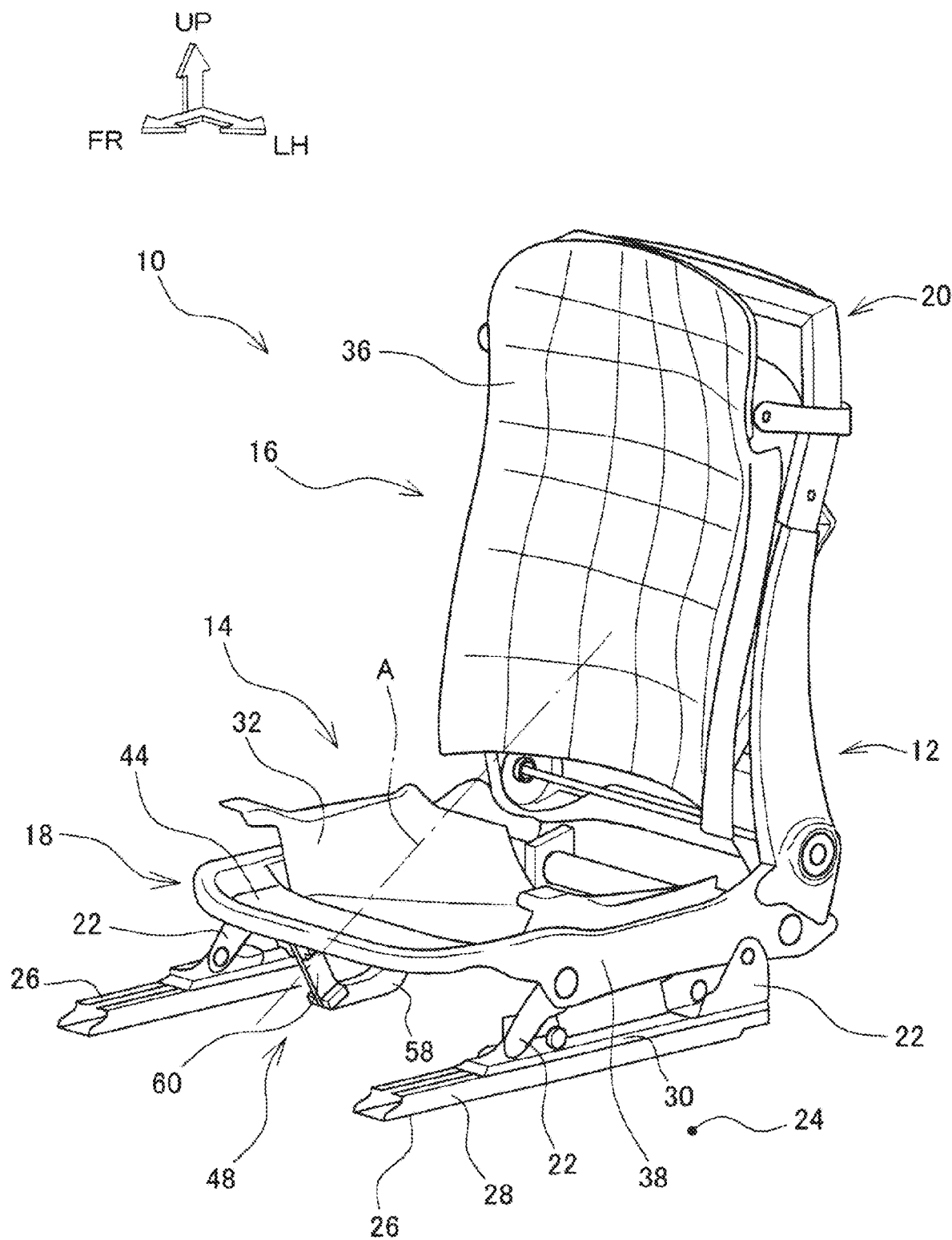
FIG. 1 is a perspective view illustrating an overall vehicle seat of an embodiment.

A vehicle seat 10 of an embodiment of the present disclosure is described below with reference to the drawings. In the following description, terms "front", "rear", "right", "left", "up", and "down" mean directions or orientations in relation to an occupant seated on the vehicle seat 10 (hereinafter referred to as a seated person) unless otherwise noted. In the drawings, a direction indicated by an arrow FR is a front side, a direction indicated by an arrow UP is an upper side, and a direction indicated by an arrow LH is a left side.

FIG. 1 is a perspective view schematically illustrating the overall structure of the vehicle seat 10. In FIG. 1, components are omitted in part. The vehicle seat 10 is a front seat applied to an automobile such as a passenger car. The vehicle seat 10 includes a main frame 12, a seat cushion 14, and a seatback 16. The main frame 12 is directly mounted on a vehicle body. The seat cushion 14 and the seatback 16 are movably supported on the main frame 12. FIG. 1 illustrates the seat cushion 14 without a cushion pad. The seat cushion 14 supports the hip and thighs of the seated person from the bottom. The seatback 16 supports the upper body of the seated person from the rear.

The main frame 12 includes a seat cushion support frame 18 and a seatback support frame 20. The seat cushion support frame 18 supports the seat cushion 14. The seatback support frame 20 supports the seatback 16. The seat cushion support frame 18 has seat legs 22 at four corners in the bottom. The seat legs 22 are arranged on a floor 24 of the vehicle, and are coupled to a pair of seat tracks 26 extending in a front-rear direction of the vehicle. The seat track 26 includes a lower rail 28 and an upper rail 30. The lower rail 28 is fixed to the floor 24. The upper rail 30 is slidable relative to the lower rail 28. The seat legs 22 are coupled to the upper rail 30. Thus, the vehicle seat 10 is mounted on the floor 24 so as to be slidable in the front-rear direction of the vehicle. The seatback support frame 20 has an inverted U-shape in front view. The lower end of the seatback support frame 20 is coupled to the rear end of the seat cushion support frame 18. The seatback support frame 20 is coupled to the seat cushion support frame 18 so as to be pivotable about an axis extending along a lateral direction. By pivoting the seatback support frame 20 relative to the seat cushion support frame 18, the tilt of the seatback 16 can be adjusted. The seatback support frame 20 may stationarily be coupled to the seat cushion support frame 18.

Figure 2A:
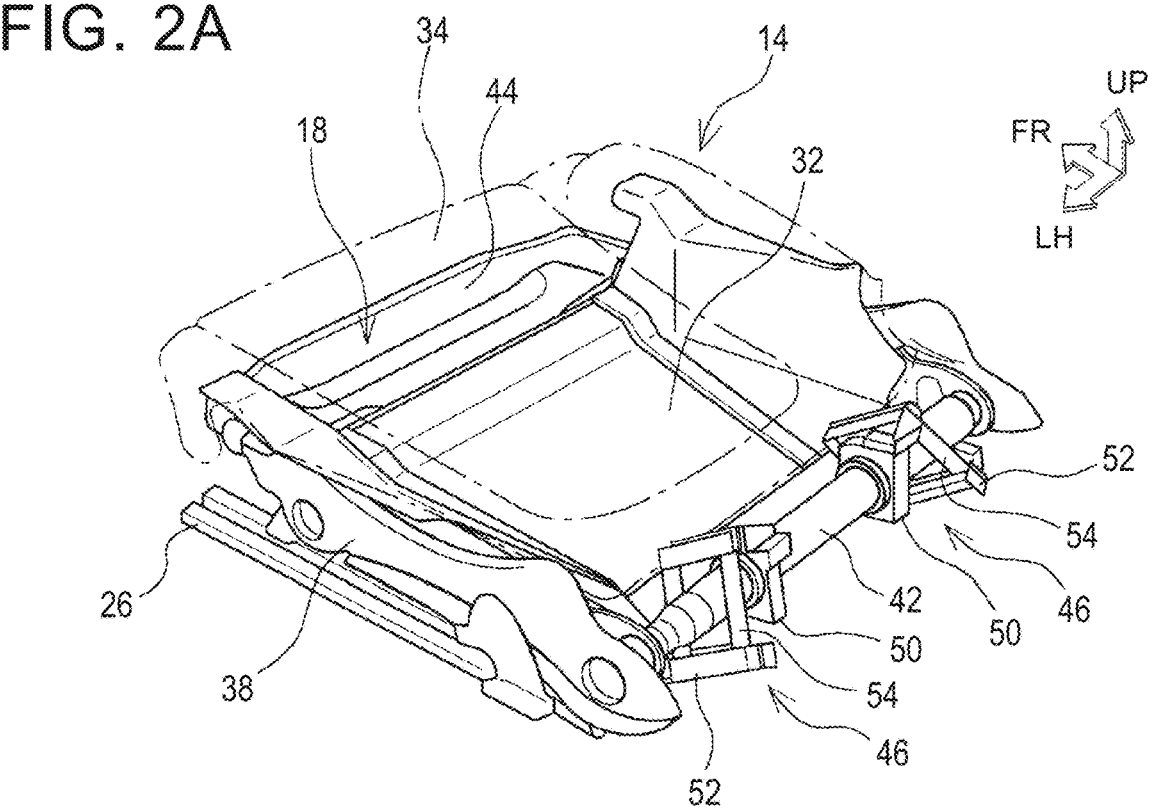
FIG. 2A is a diagram illustrating a seat cushion, a seat cushion support frame, and support structures that suspend the seat cushion, and illustrating an upper side of the seat cushion.
Figure 2B:
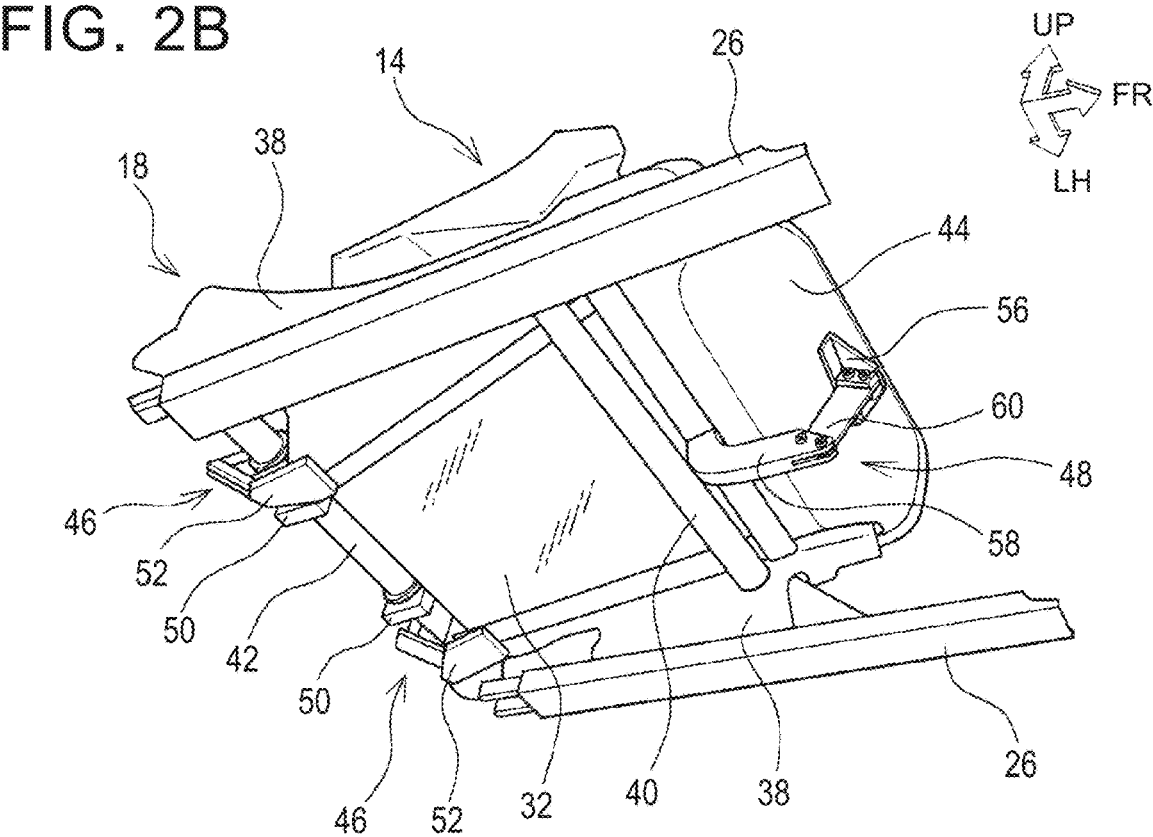
FIG. 2B is a diagram illustrating the seat cushion, the seat cushion support frame, and the support structures that suspend the seat cushion, and illustrating a lower side of the seat cushion.

The seat cushion 14 includes a cushion pan 32 and a cushion pad 34 (see FIG. 2A). The cushion pan 32 is movably supported on the seat cushion support frame 18. The cushion pad 34 is attached onto the cushion pan 32. A structure that supports the cushion pan 32 is described later in detail.

The seatback 16 is supported on the seatback support frame 20. FIG. 1 illustrates a seatback pad 36 where the back of the seated person is in contact. A seatback frame (not illustrated) to which the seatback pad 36 is attached is arranged at the back of the seatback pad 36. The seatback frame is supported while being suspended from the seatback support frame 20 by a wire (not illustrated). Thus, the seatback 16 is supported so as to be swingable in the lateral direction relative to the main frame 12.

Figure 3:
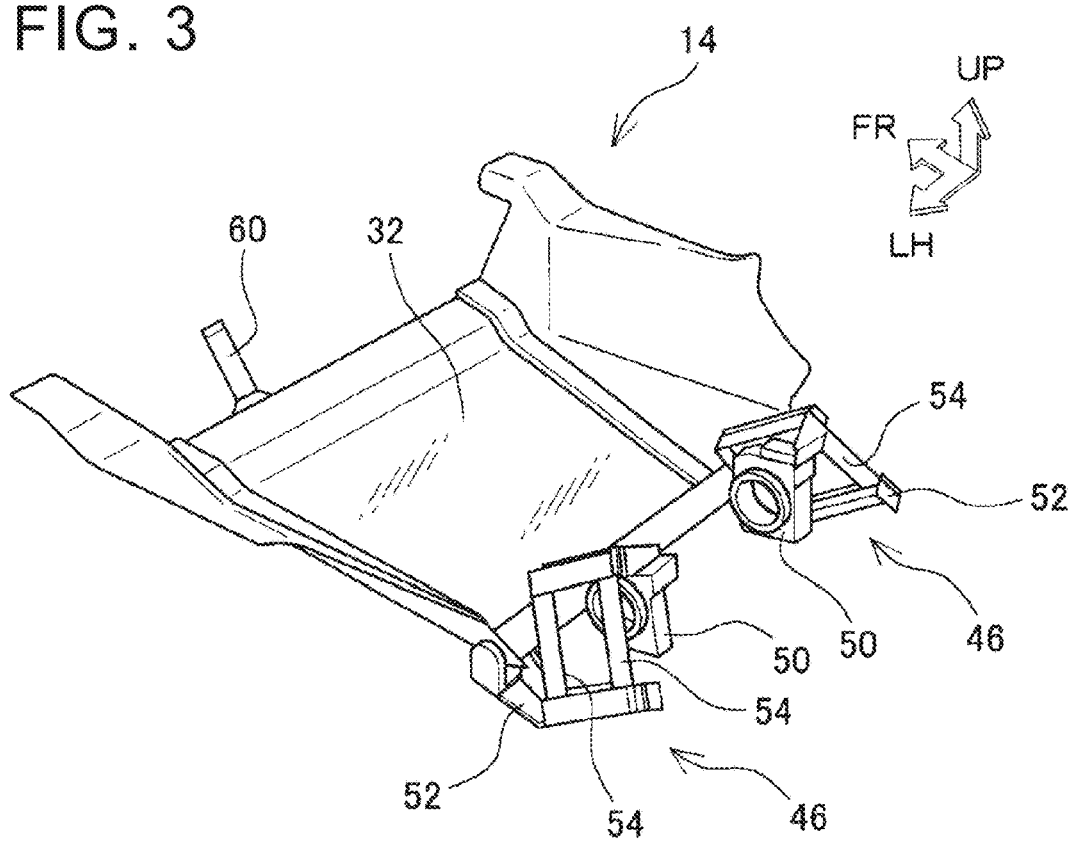
FIG. 3 is a local view illustrating the support structures and the seat cushion that is a component on a movement side in FIG. 2A.
Figure 4:
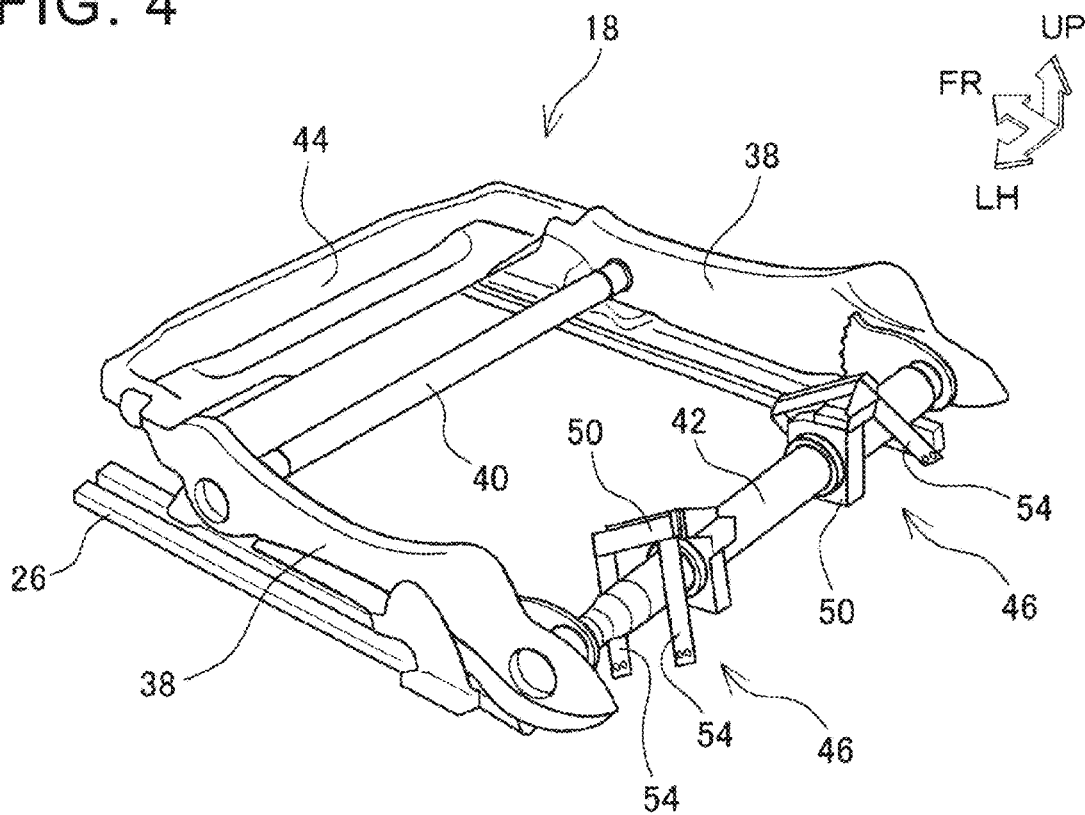
FIG. 4 is a local view illustrating the support structures and the seat cushion support frame that is a component on a stationary side in FIG. 2A.
Figure 5:
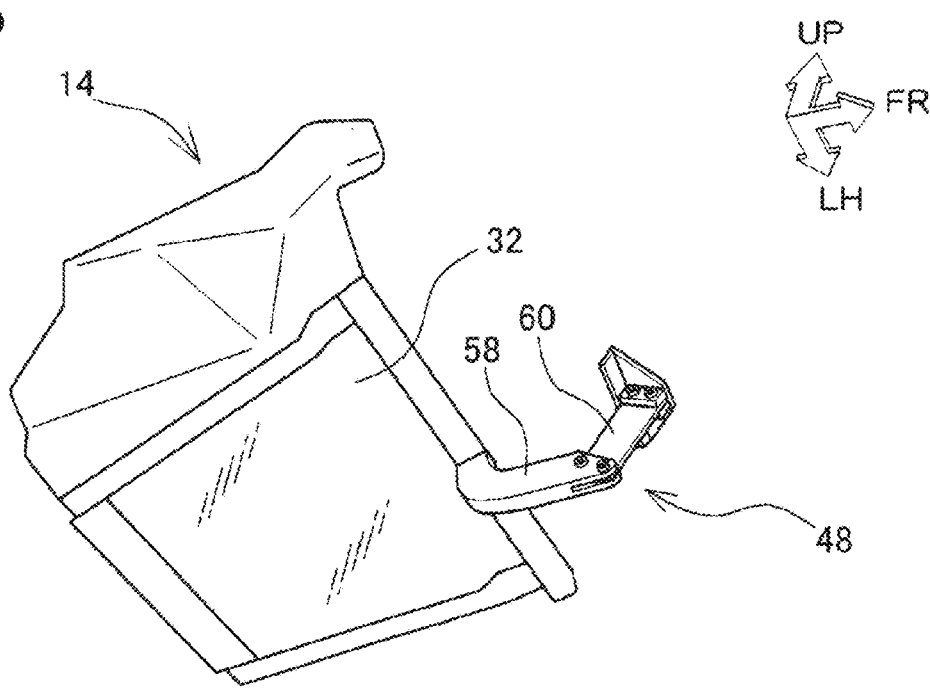
FIG. 5 is a local view illustrating the support structures and the seat cushion that is a component on the movement side in FIG. 2B.
Figure 6:
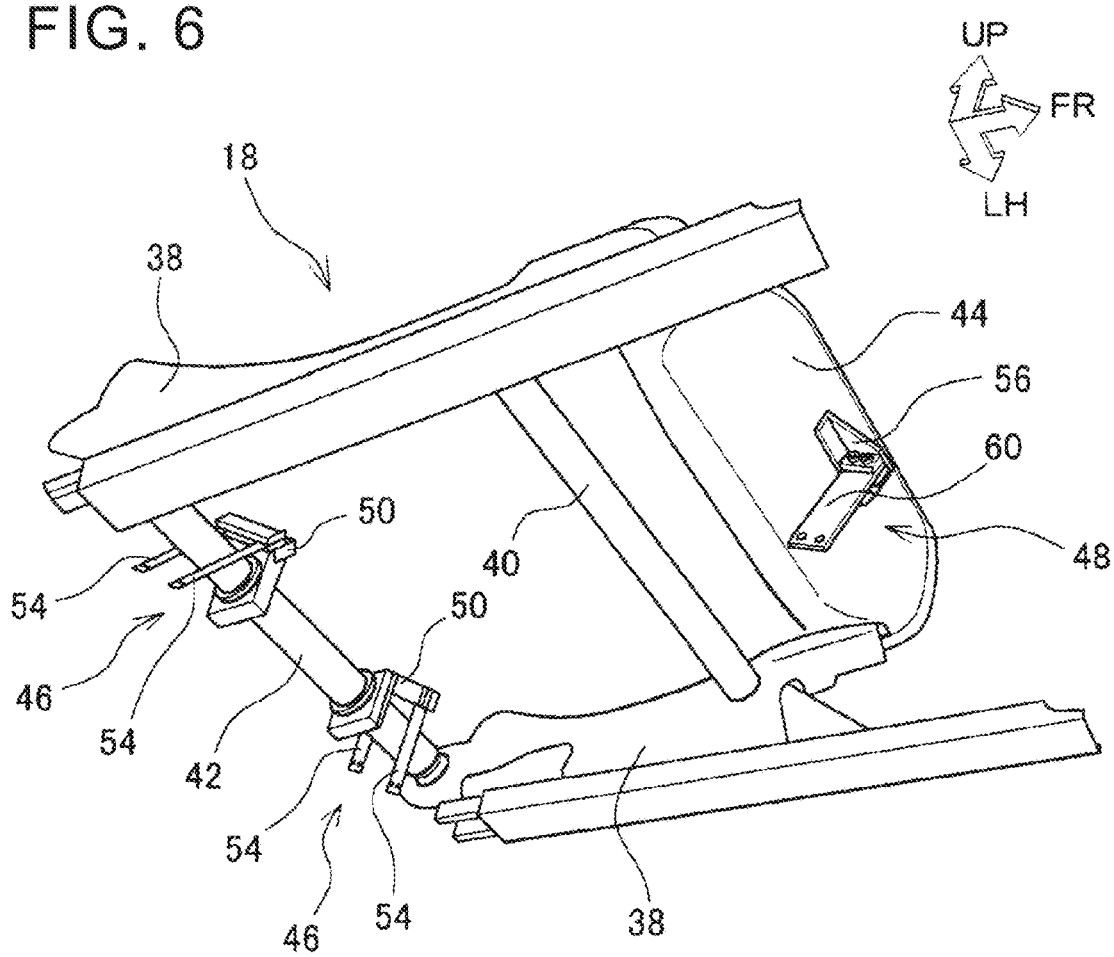
FIG. 6 is a local view illustrating the support structures and the seat cushion support frame that is a component on the stationary side in FIG. 2B.
Figure 7:
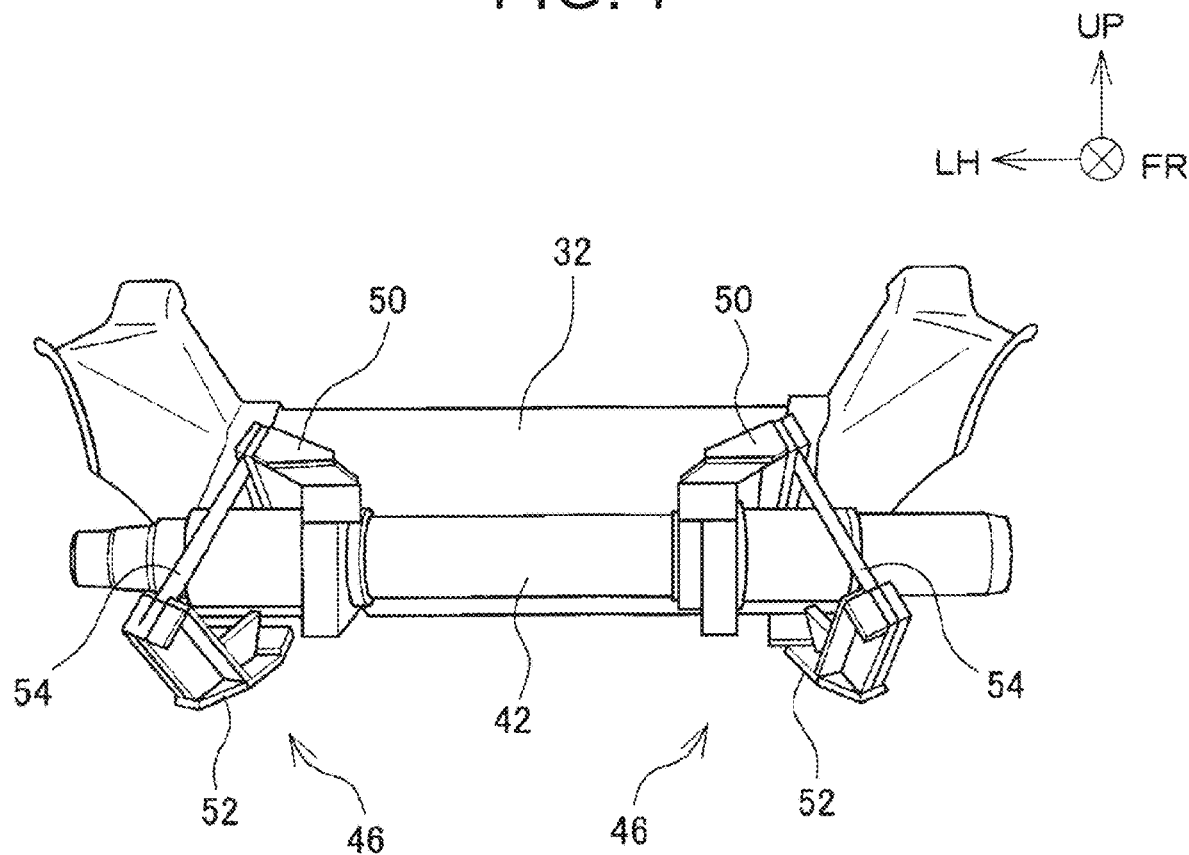
FIG. 7 is a rear view illustrating the seat cushion and the seat cushion support frame.

FIG. 2A to FIG. 7 are diagrams illustrating the seat cushion 14, the seat cushion support frame 18, and surrounding structures. FIG. 2A and FIG. 2B are diagrams illustrating a state in which the seat cushion 14 and the seat cushion support frame 18 are assembled. FIG. 2A illustrates a state in which the seat cushion 14 and the seat cushion support frame 18 are viewed downward focusing mainly on the rear of the seat cushion 14. FIG. 2B illustrates a state in which the seat cushion 14 and the seat cushion support frame 18 are viewed upward focusing mainly on the front of the seat cushion 14. FIG. 2A illustrates the cushion pan 32 and the seat cushion support frame 18 below the cushion pad 34 in a transparent representation indicated by long dashed short dashed lines. In FIG. 3 and other subsequent figures, the cushion pad 34 is omitted. FIG. 3 and FIG. 5 illustrate a movable part, and FIG. 4 and FIG. 6 illustrate a stationary part.

The seat cushion support frame 18 includes a pair of side members 38 and two coupling bars 40 and 42. The side members 38 are arranged at the right and left of the seat cushion 14, and extend in the front-rear direction. The coupling bars 40 and 42 couple the right and left side members 38. The side member 38 is a roughly plate-shaped member, and is arranged such that its thickness direction corresponds to the lateral direction. The front coupling bar 40 out of the two coupling bars 40 and 42 couples the side members 38 at their front ends. The rear coupling bar 42 couples the side members 38 at their rear ends. The seat cushion support frame 18 further includes a front member 44 arranged at the front so as to bridge the right and left side members 38. The front member 44 is a roughly plate-shaped or tray-shaped member, and is arranged such that its thickness direction corresponds to an up-down direction. The front member 44 is coupled to the upper front ends of the right and left side members 38, and projects forward from the front ends of the side members 38 like a canopy.

Support structures 46 and 48 that support the seat cushion 14 are provided at two right and left positions on the rear of the seat cushion 14, and at one central position on the front of the seat cushion 14. The support structures 46 provided at the rear are referred to as rear support structures 46, and the support structure 48 provided at the front is referred to as a front support structure 48.

Each of the right and left rear support structures 46 includes a rear support bracket 50, a rear suspension bracket 52, and two rear leaf springs 54. The rear support bracket 50 is fixed to the rear coupling bar 42 in terms of the front-rear, up-down, and lateral directions, and is coupled to the rear coupling bar 42 so as to be pivotable about an axis extending in the lateral direction. The rear suspension bracket 52 is fixed to the rear end of the cushion pan 32. The rear leaf springs 54 are arranged so as to sandwich the rear coupling bar 42. The upper ends of the rear leaf springs 54 are fixed to the rear support bracket 50, and the lower ends of the rear leaf springs 54 are fixed to the rear suspension bracket 52. That is, the upper ends of the rear leaf springs 54 are fixed to the rear coupling bar 42 by being fixed to the rear support bracket 50, and the lower ends of the rear leaf springs 54 are fixed to the cushion pan 32 by being fixed to the rear suspension bracket 52. The rear leaf spring 54 functions as a rear suspension member that supports the seat cushion 14 at its rear, that is, at a rear edge where the seatback 16 is provided, while the seat cushion 14 is suspended from the seat cushion support frame 18. The right and left rear leaf springs 54 are arranged such that the distance between the upper ends is smaller than the distance between the lower ends, and assume an inverted V-shape in rear view. The rear leaf spring 54 is arranged such that its thickness direction is orthogonal to the front-rear direction. Thus, lateral movement of the rear of the seat cushion 14 is permitted, but front-rear movement of the rear of the seat cushion 14 is restricted. For example, the rear leaf spring 54 may be made of carbon tool steel or stainless steel having a thickness of 0.8 to 1.0 mm.

The upper end of the rear leaf spring 54 is sandwiched in the thickness direction between two plate members that are parts of the rear support bracket 50. Thus, the upper end of the rear leaf spring 54 is a fixed end. The lower end of the rear leaf spring 54 is sandwiched between two plate members that are parts of the rear suspension bracket 52. Thus, the lower end of the rear leaf spring 54 is a fixed end.

The front support structure 48 includes a front support bracket 56, a front suspension bracket 58, and a front leaf spring 60. The front support bracket 56 is fixed to the lower surface of the front member 44 of the seat cushion support frame 18. The front suspension bracket 58 is fixed to the front end of the cushion pan 32, and extends forward. The upper end of the front leaf spring 60 is fixed to the front support bracket 56, and the lower end of the front leaf spring 60 is fixed to the front suspension bracket 58. The front leaf spring 60 functions as a front suspension member that supports the seat cushion 14 at its front while the seat cushion 14 is suspended from the seat cushion support frame 18. The front leaf spring 60 is vertically arranged in front view, and is arranged such that its thickness direction corresponds to the lateral direction. Thus, lateral movement of the front of the seat cushion 14 is permitted, but front-rear movement of the front of the seat cushion 14 is restricted. For example, the front leaf spring 60 may be made of carbon tool steel or stainless steel having a thickness of 0.8 to 1.0 mm.

The upper end of the front leaf spring 60 is sandwiched in the thickness direction between the front support bracket 56 and a holding plate. Thus, the upper end of the front leaf spring 60 is a fixed end. The lower end of the front leaf spring 60 is sandwiched in the thickness direction between the front suspension bracket 58 and a holding plate. Thus, the lower end of the front leaf spring 60 is a fixed end.

The seat cushion 14 is supported at three positions by the rear support structures 46 and the front support structure 48 while being suspended from the seat cushion support frame 18, and is movable in the lateral direction. In particular, the seat cushion 14 roughly pivots about an axis A illustrated in FIG. 1. Through the pivot, movement of the seated person at a part near the pivot axis A can be reduced as compared to movement of the seated person at a part near the seat cushion 14, specifically, hip and thighs.

Figure 8:
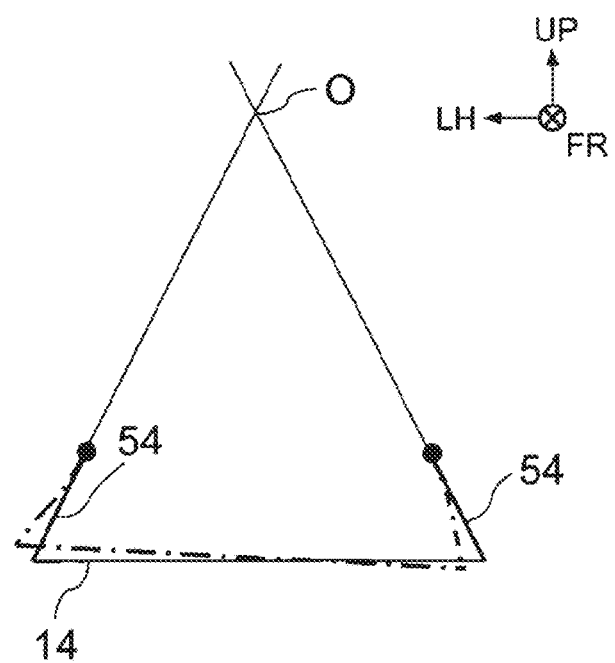
FIG. 8 is an explanatory drawing of movement of the seat cushion.

FIG. 8 is an explanatory drawing of movement of the seat cushion 14. FIG. 8 is a schematic rear view of the seat cushion 14 and the rear leaf springs 54. Continuous lines indicate the seat cushion 14 located at a central position in the lateral direction (hereinafter referred to as a neutral position), and the rear leaf springs 54 at this time. At the neutral position, the seat cushion 14 is located horizontally. As described above, the two rear leaf springs 54 are arranged in the inverted V-shape, and lines extending from the rear leaf springs 54 intersect at a point O. When the seat cushion 14 moves leftward, the left end is higher and the right end is lower as compared to the case where the seat cushion 14 is located at the neutral position because the rear leaf springs 54 are arranged in the inverted V-shape. Thus, the seat cushion 14 is tilted rightward. This state is indicated by long dashed short dashed lines. When the seat cushion 14 moves rightward, the seat cushion 14 is tilted leftward in turn. This movement may be regarded as a pivot about the point O if the movement range is a narrow range, for example, a range of about 3° in terms of a half amplitude.

The upper end and the lower end of the rear leaf spring 54 are fixed ends, and the rear leaf spring 54 is deflected through the lateral movement of the seat cushion 14. An elastic force generated by the deflection may return the seat cushion 14 to the neutral position. When the upper end of the rear leaf spring 54, that is, the end on the stationary side is a fixed end, the elastic force for returning the seat cushion 14 to the neutral position, that is, a restoration force is generated.

When the seat cushion 14 moves in the lateral direction, movement of the front of the seat cushion 14 may be regarded as a pivot about the upper end of the front leaf spring 60, that is, the end on the stationary side if the movement range is a narrow range. The upper end and the lower end of the front leaf spring 60 are fixed ends, and the front leaf spring 60 is deflected when the seat cushion moves in the lateral direction, thereby generating a restoration force for returning the seat cushion to the neutral position. When the upper end of the front leaf spring 60, that is, the end on the stationary side is a fixed end, the restoration force for returning the seat cushion to the neutral position is generated.

Through the arrangement of the rear leaf springs 54 and the front leaf spring 60, the center of the pivot of the seat cushion 14 is higher at the rear and lower at the front. As a result, the pivot axis of the seat cushion 14 corresponds to the axis A in FIG. 1 that is lower at the front. The rear leaf springs 54 and the front leaf spring 60 may be arranged such that their longitudinal directions are orthogonal to the axis A. The rear leaf springs 54 and the front leaf spring 60 may also be arranged such that their longitudinal directions correspond to a vertical direction in side view.

Figure 9:
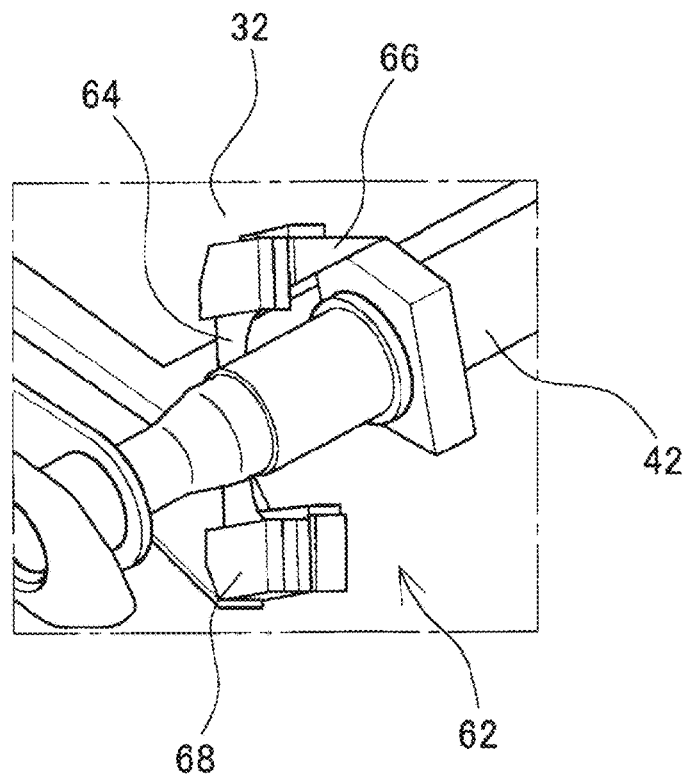
FIG. 9 is a diagram illustrating another form of a rear support structure.

The rear support structure 46 suspends the seat cushion by the pair of rear leaf springs 54 arranged so as to sandwich the rear coupling bar 42, but the present disclosure is not limited to this case. The seat cushion may be suspended by one rear leaf spring alone. A rear support structure 62 illustrated in FIG. 9 includes one rear leaf spring 64 alone. A rear support bracket 66 is fixed to the rear coupling bar 42 in terms of the front-rear, up-down, and lateral directions, and is coupled to the rear coupling bar 42 so as to be pivotable about an axis extending in the lateral direction. A rear suspension bracket 68 is fixed to the rear edge of the cushion pan 32. The upper end of the rear leaf spring 64 is fixed to the rear support bracket 66, and the lower end of the rear leaf spring 64 is fixed to the rear suspension bracket 68. Similarly to the rear support structures 46, right and left rear leaf springs 64 are arranged in an inverted V-shape in rear view.

The front support structure 48 is arranged at the center in the lateral direction, but the present disclosure is not limited to this case. Similarly to the rear support structures 46, front support structures may be arranged at two right and left positions. In this case, front leaf springs may be arranged in an inverted V-shape similarly to the rear leaf springs 54. An intersection of lines extending from the two front leaf springs arranged in the inverted V-shape is a center of a pivot of the front of the seat cushion. A line connecting the centers of the pivot of the front and the rear is a pivot axis of the seat cushion. In this case as well, the pivot axis may be lower at the front.

Figure 10:
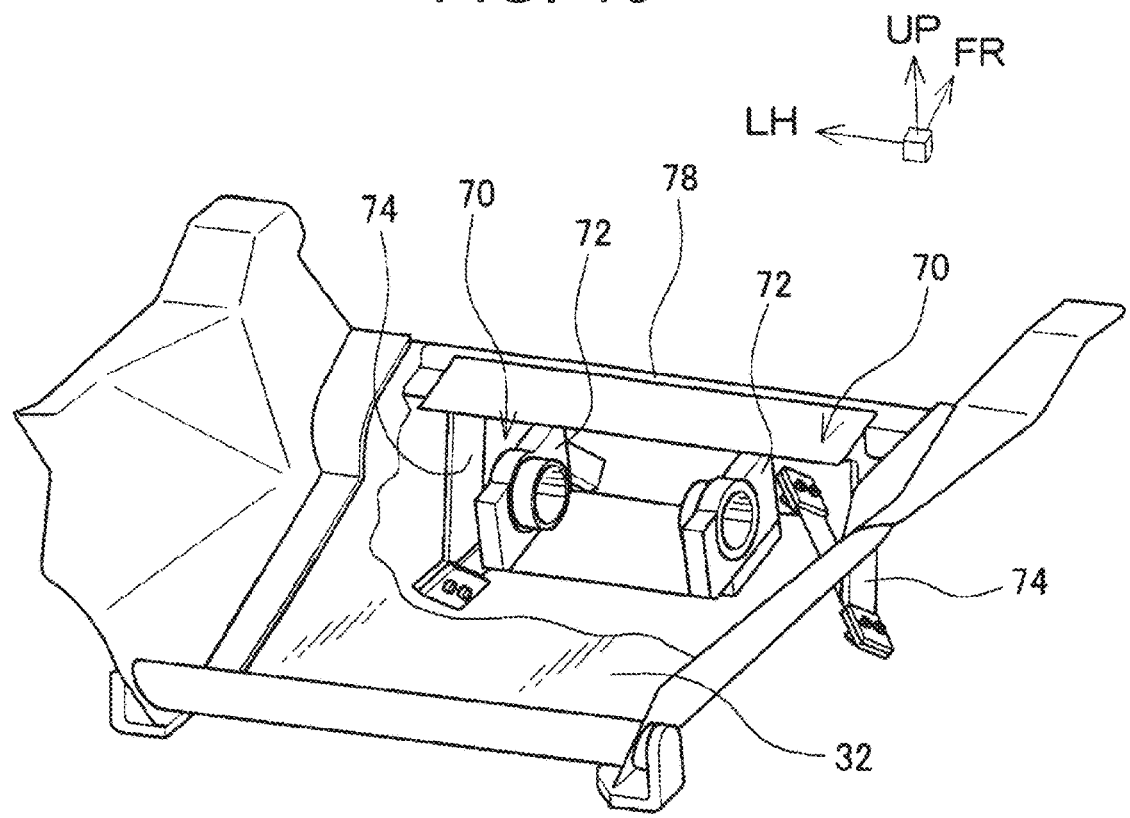
FIG. 10 is a diagram illustrating another form of a front support structure that is viewed obliquely downward from the rear.
Figure 11:
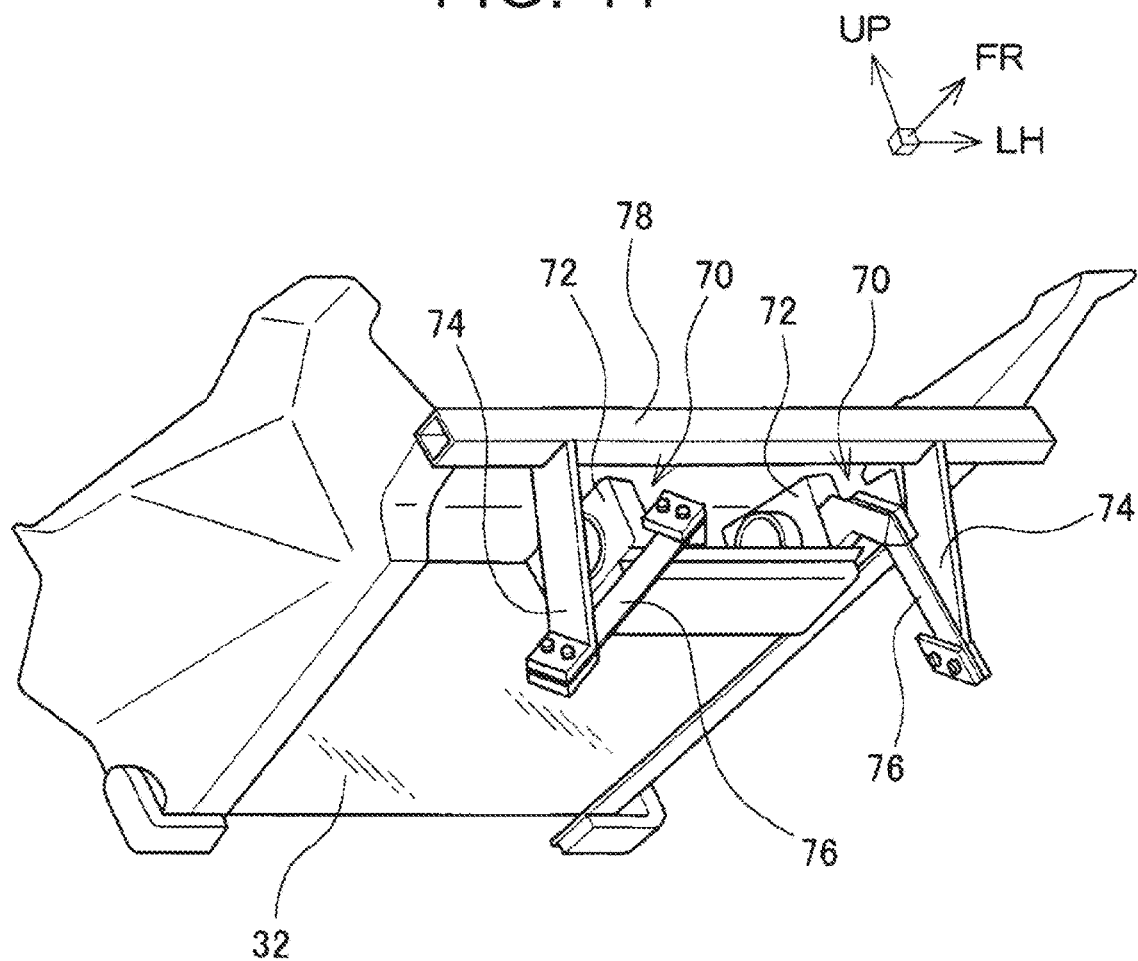
FIG. 11 is a diagram illustrating the other form of the front support structure that is viewed obliquely upward from the front.

FIG. 10 and FIG. 11 are diagrams illustrating an example in which front support structures 70 are arranged at two right and left positions. FIG. 10 is a diagram illustrating the cushion pan 32 that is viewed obliquely downward from the rear in a state in which a bottom plate is partially cut away. FIG. 11 is a diagram illustrating the cushion pan 32 that is viewed obliquely upward from the front. Each front support structure 70 includes a front support bracket 72, a front suspension bracket 74, and a front leaf spring 76. The front support bracket 72 is fixed to the front coupling bar 40 (see FIG. 4) in terms of the front-rear, up-down, and lateral directions, and is coupled to the front coupling bar 40 so as to be pivotable about an axis extending in the lateral direction. The upper end of the front suspension bracket 74 is fixed to a reinforcement bar 78 provided at the front edge of the cushion pan 32, and the front suspension bracket 74 extends downward. The upper end of the front leaf spring 76 is fixed to the front support bracket 72, and the lower end of the front leaf spring 76 is fixed to the lower end of the front suspension bracket 74. The front leaf spring 76 functions as the front suspension member that supports the seat cushion 14 at its front while the seat cushion 14 is suspended from the seat cushion support frame 18. Two right and left front leaf springs 76 are arranged in an inverted V-shape in front view. The front leaf spring 76 is arranged such that its thickness direction is orthogonal to the front-rear direction. Thus, lateral movement of the front of the seat cushion 14 is permitted, but front-rear movement of the front of the seat cushion 14 is restricted. For example, the front leaf spring 76 may be made of carbon tool steel or stainless steel having a thickness of 0.8 to 1.0 mm.

The upper end of the front leaf spring 76 is sandwiched in the thickness direction between the front support bracket 72 and a holding plate. Thus, the upper end of the front leaf spring 76 is a fixed end. The lower end of the front leaf spring 76 is sandwiched in the thickness direction between the front suspension bracket 74 and a holding plate. Thus, the lower end of the front leaf spring 76 is a fixed end.

Figure 12:
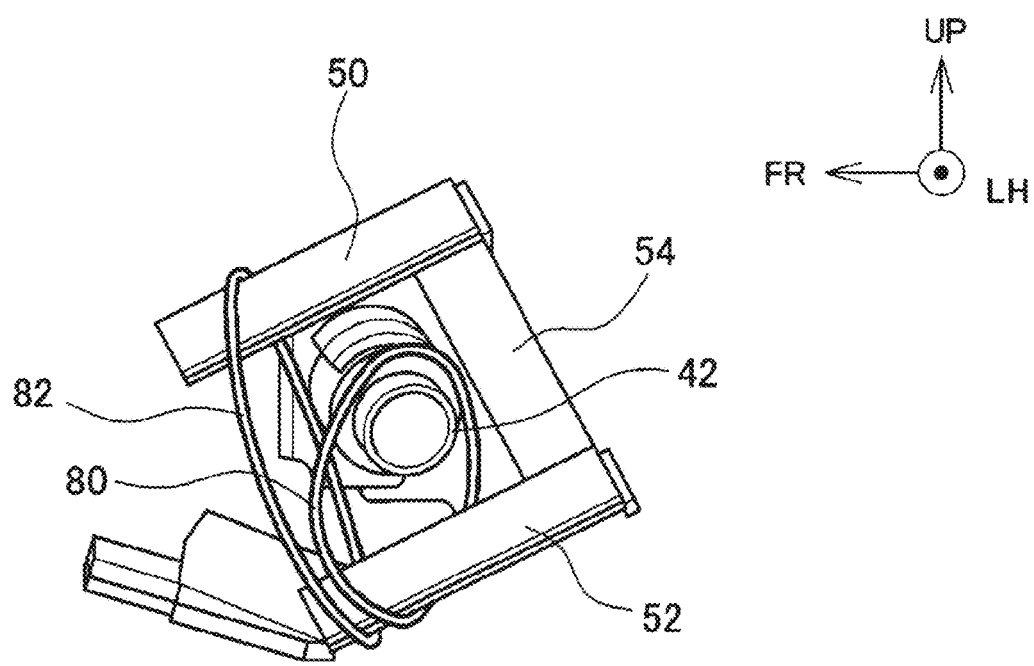
FIG. 12 is a diagram illustrating a retaining structure for the seat cushion using wires.
Figure 13:
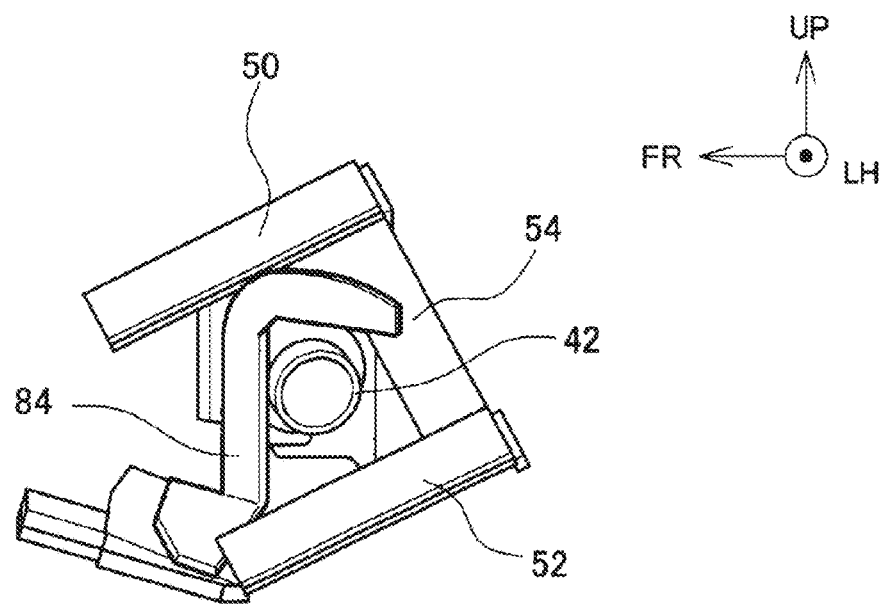
FIG. 13 is a diagram illustrating a retaining structure for the seat cushion using a hook.

It is desirable that the seat cushion 14 be prevented from falling when the suspension member such as the leaf spring is broken. FIG. 12 and FIG. 13 are diagrams illustrating retaining members. FIG. 12 and FIG. 13 illustrate the rear support structure 46 in which the leaf spring 54 on the front side out of the two leaf springs 54 is omitted and the leaf spring 54 on the rear side is left alone. FIG. 12 is a diagram illustrating a retaining structure using wires. A retaining wire 80 is looped around the rear suspension bracket 52 and the rear coupling bar 42. A retaining wire 82 is looped around the rear suspension bracket 52 and the rear support bracket 50. The rear suspension bracket 52 is a member integrated with the seat cushion 14. The rear coupling bar 42 and the rear support bracket 50 are parts of the seat cushion support frame 18 or members integrated with the seat cushion support frame 18. Thus, when the rear leaf spring 54 is broken, the seat cushion 14 is suspended by the retaining wires 80 and 82, thereby being restrained from falling.

FIG. 13 is a diagram illustrating a retaining structure using a hook. A retaining hook 84 is coupled to the rear suspension bracket 52, and is arranged such that the distal end is hooked on the rear coupling bar 42. The rear suspension bracket 52 is a member integrated with the seat cushion 14. When the rear leaf spring 54 is broken, the retaining hook 84 is hooked on the rear coupling bar 42, whereby the seat cushion 14 is restrained from falling.

Wires or rods each movably coupled at the upper end and the lower end like a joint may be used in place of the leaf springs of the rear support structure 46 or 62 and the front support structure 48 or 70. The wire or the like may be used only for the front support structure or for the rear support structure. When the wire or the like is used for both the front support structure and the rear support structure, an elastic member such as a leaf spring may additionally be used in order to apply a restoration force toward the neutral position. The leaf spring is an elastic member that does not extend or contract in its longitudinal direction but only bends in its thickness direction. Any elastic member having such a characteristic may be used in place of the leaf springs of the rear support structure 46 or 62 and the front support structure 48 or 70.

The rear support bracket 50 or 66 of the rear support structure 46 or 62 is fixed to the rear coupling bar 42 of the seat cushion support frame 18, but may be fixed to another portion of the seat cushion support frame 18. Similarly, the front support bracket 72 of the front support structure 70 may be fixed to a portion of the seat cushion support frame 18 other than the front coupling bar 40.

Figure 14:
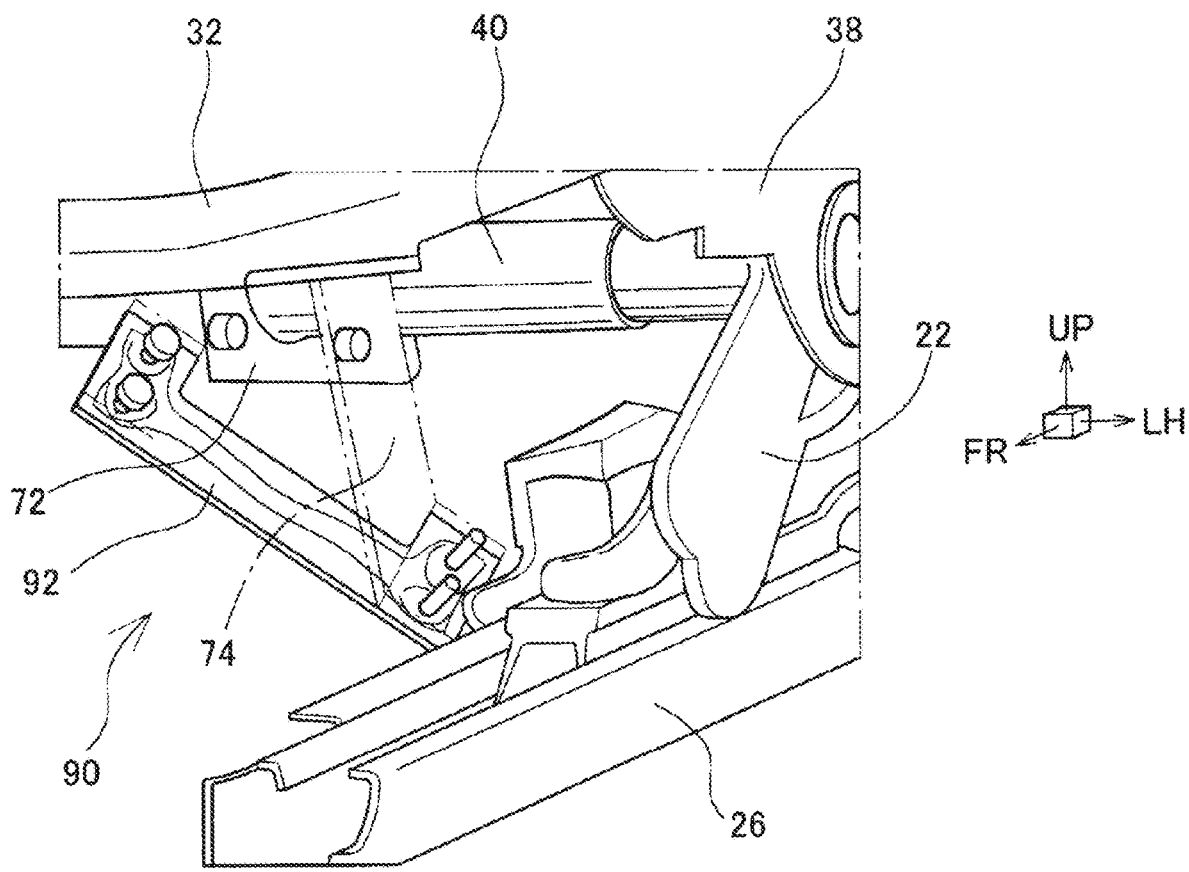
FIG. 14 is a diagram illustrating still another form of the front support structure.

FIG. 14 to FIG. 19 are diagrams illustrating another example of the front leaf spring. FIG. 14 is a perspective view illustrating a front support structure 90. The front support structure 90 is identical to the front support structure 70 except for a front leaf spring 92. The same components are represented by the same reference symbols to omit their description. In FIG. 14, a member indicated by long dashed short dashed lines is made transparent in order to clearly illustrate the shape of the front leaf spring 92. Similarly to the front leaf spring 76, the front leaf spring 92 functions as the front suspension member that supports the seat cushion 14 at its front while the seat cushion 14 is suspended from the seat cushion support frame 18. Two right and left front leaf springs 92 are arranged in an inverted V-shape in front view, and are arranged such that the front leaf springs 92 are inclined forward in side view, that is, the upper ends are located on a front side with respect to the lower ends. The front leaf spring 92 is arranged such that its thickness direction is orthogonal to the front-rear direction.

Figure 15:
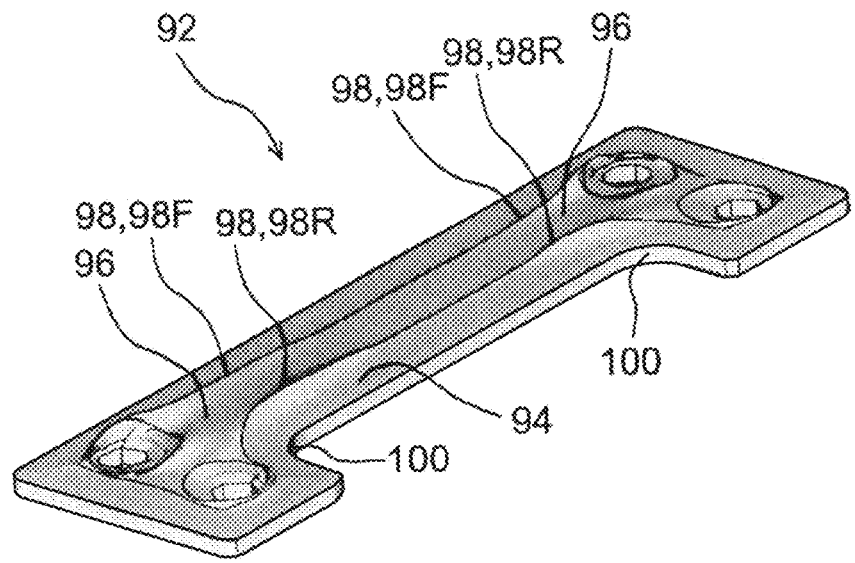
FIG. 15 is a perspective view illustrating an example of a front leaf spring.
Figure 16:
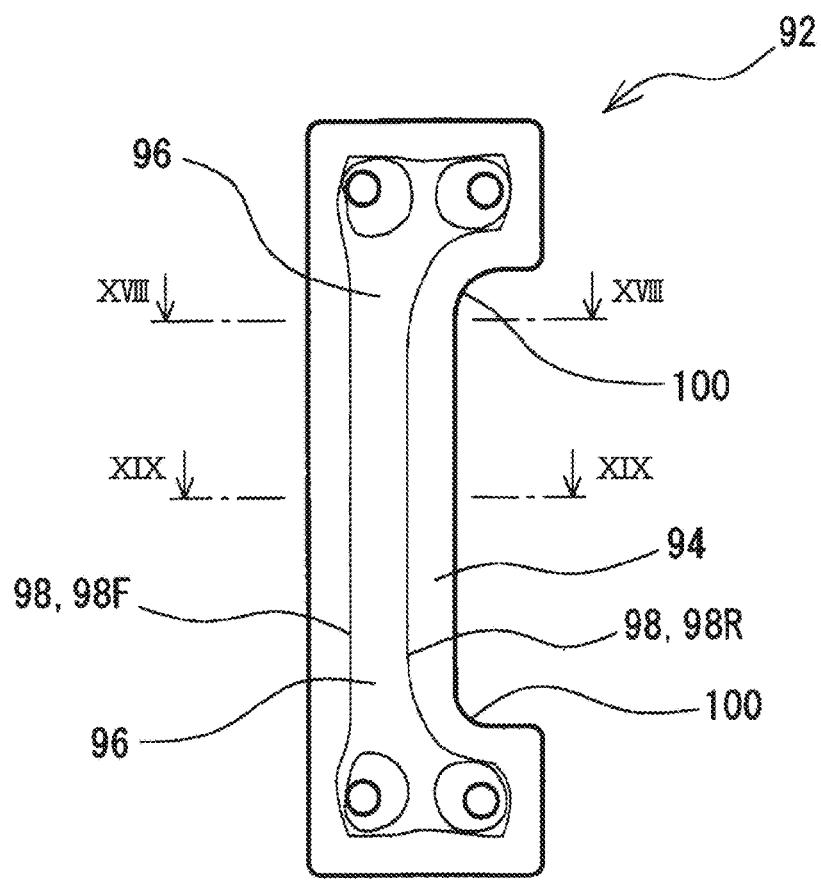
FIG. 16 is a front view of the front leaf spring illustrated in FIG. 15.
Figure 17:
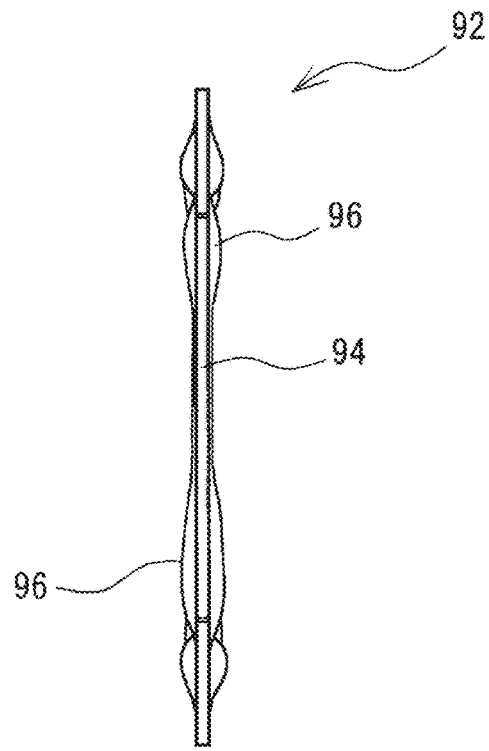
FIG. 17 is a side view of the front leaf spring illustrated in FIG. 15.
Figure 18:
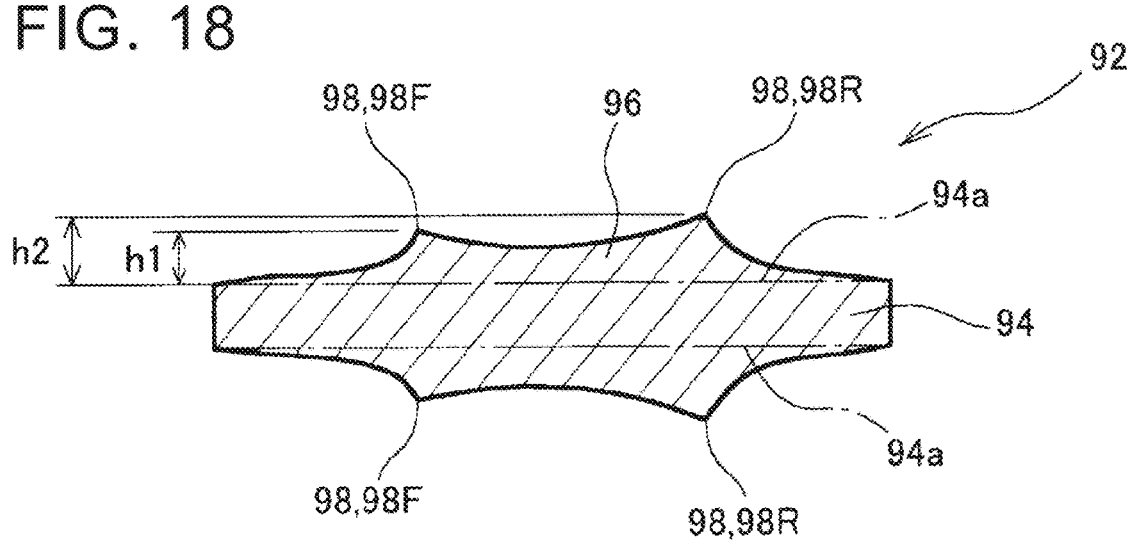
FIG. 18 is a sectional view of the front leaf spring taken along a line XVIII-XVIII in FIG. 16.
Figure 19:
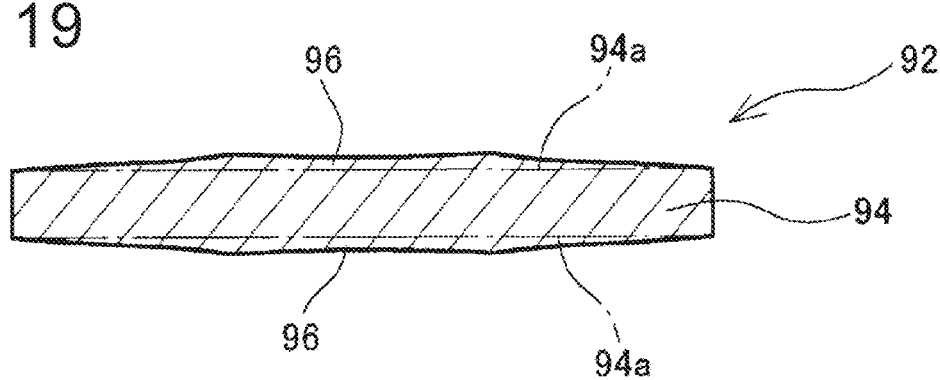
FIG. 19 is a sectional view of the front leaf spring taken along a line XIX-XIX in FIG. 16.

FIG. 15 to FIG. 19 are diagrams illustrating the shape of the front leaf spring 92. FIG. 15 is a perspective view. FIG. 16 is a front view illustrating the widest surface (plate surface). FIG. 17 is a right-hand side view of FIG. 16. FIG. 18 and FIG. 19 are sectional views taken along lines XVIII-XVIII and XIX-XIX in FIG. 16, respectively.

As illustrated in FIG. 16, the front leaf spring 92 has a C-shape, and is arranged such that an open side of the C-shape is oriented rearward as illustrated in FIG. 14 when mounted. The front leaf spring 92 includes a base plate 94 and ridges 96. The base plate 94 has a uniform thickness. The ridges 96 project from the base plate 94, and extends in a longitudinal direction of the front leaf spring 92. The thickness of the base plate 94 is defined at the thinnest portion of the front leaf spring 92. The ridges 96 project from a plate surface 94a orthogonal to the thickness direction. In the front leaf spring 92, the ridges 96 are formed on both front and back surfaces of the base plate 94, but the ridges 96 may be formed on one surface alone. The height of the ridges 96, that is, the distance from the plate surface 94a to the top is large at both ends in the longitudinal direction of the front leaf spring 92, and gradually decreases toward the center. By increasing the height of the ridges 96, that is, the thickness of the front leaf spring 92 at the ends, the strength of each end where a stress concentrates is increased. By reducing the thickness at the center, overall deflection of the front leaf spring 92 is secured.

As illustrated in FIG. 18, the ridge 96 is provided at the center of the front leaf spring 92 in its width direction, and the front leaf spring 92 is thin at both edges in the width direction. Thus, the stress increases at the ridge 96, and decreases at the edges. It may be likely that the edge is cracked. By reducing the stress at the edge, it is possible to reduce the occurrence of a case where the front leaf spring 92 is torn off due to the crack in the edge. The ridge 96 has two ridge lines 98 extending in parallel along the longitudinal direction. By providing the two ridge lines 98 spaced away from each other in the width direction, torsional stiffness can be increased as compared to a case of one ridge line. The height of the ridge 96 may be set larger on a rear ridge line 98R than a front ridge line 98F. In the front leaf spring 92, the stress increases at inner corners 100 of the C-shape. By increasing the height of the rear ridge line 98R, the stress at the corners 100 can further be reduced.

The front leaf spring 92 may be made of a fiber reinforced resin. In particular, the front leaf spring 92 may be made of a carbon fiber reinforced resin. Further, the front leaf spring 92 may be made of a unidirectional fiber reinforced resin in which reinforcement fibers extend in the longitudinal direction of the front leaf spring 92.

Figure 20:
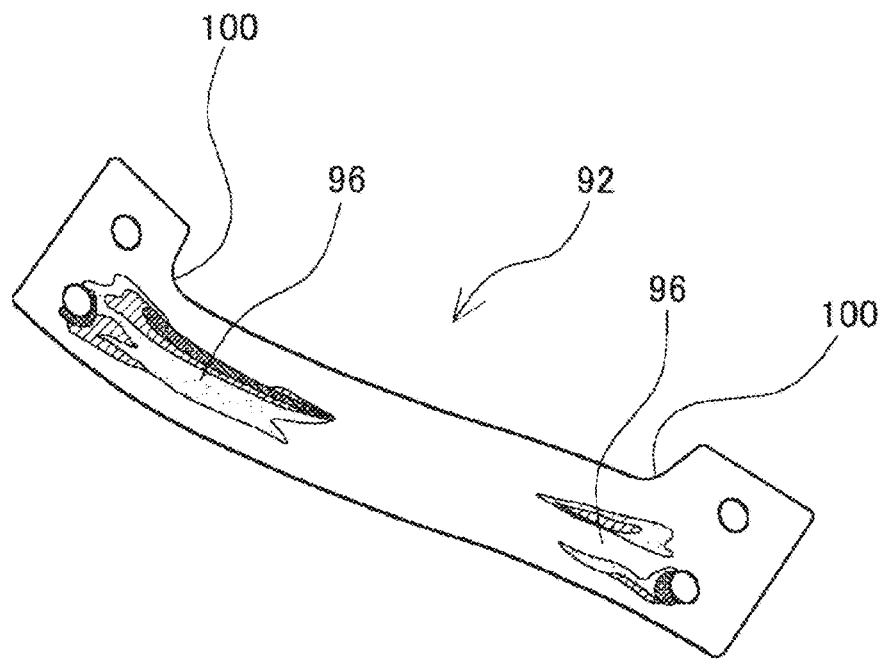
FIG. 20 is a diagram illustrating stress distribution of the front leaf spring illustrated in FIG. 15.
Figure 21:
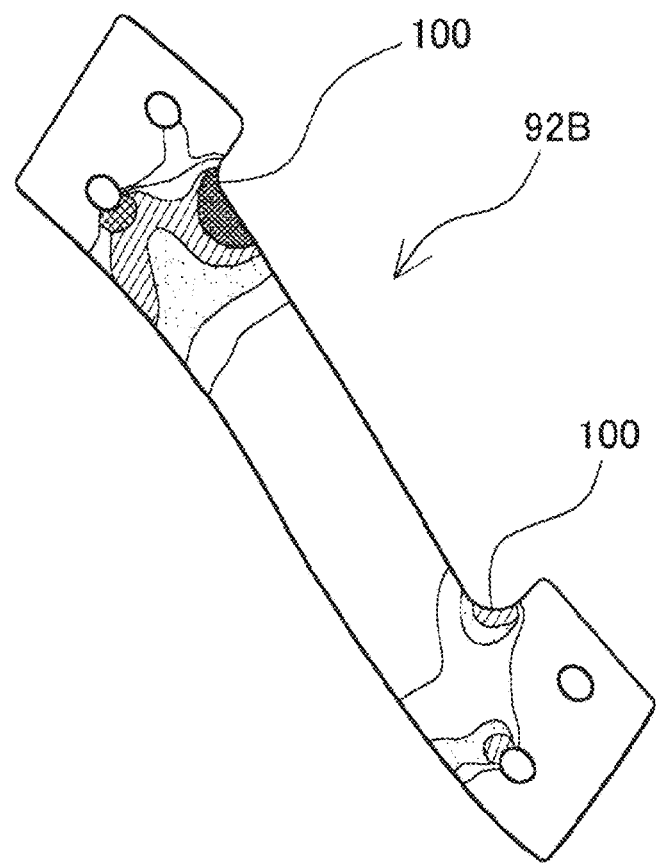
FIG. 21 is a diagram illustrating stress distribution of a front leaf spring having a uniform thickness.

FIG. 20 is a diagram illustrating distribution of a stress that occurs when the front leaf spring 92 is deflected. FIG. 21 illustrates, as a comparative example, stress distribution of a front leaf spring 92B having a uniform thickness. The stress is highest at a cross-hatched portion. The stress decreases in order from a hatched portion to a dotted portion. In the case of a uniform thickness (see FIG. 21), a high stress occurs at the corner 100. When the ridges 96 are provided, the stress increases at the ridges 96, and decreases at the edge including the corners 100.

Figure 22:
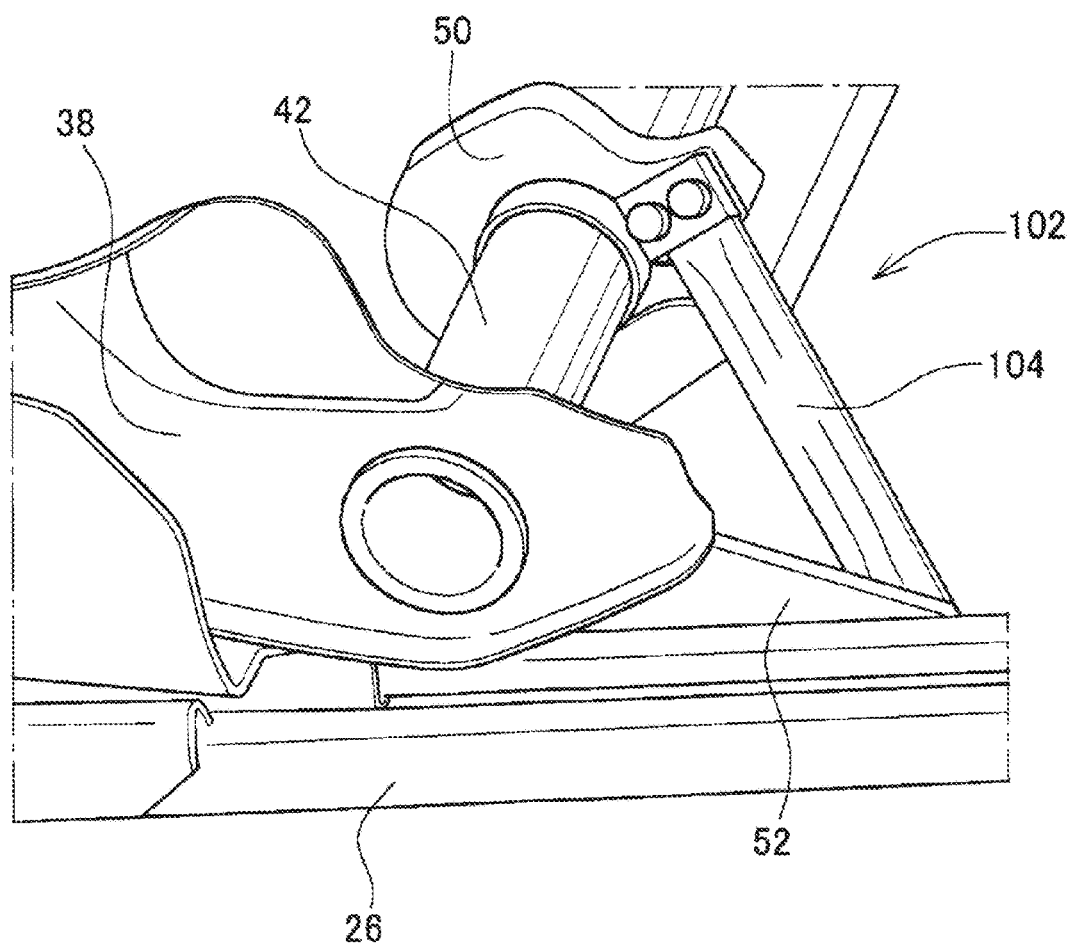
FIG. 22 is a diagram illustrating still another form of the rear support structure.

FIG. 22 to FIG. 27 are diagrams illustrating another example of the rear leaf spring. FIG. 22 is a perspective view illustrating a rear support structure 102. The rear support structure 102 is identical to the rear support structure 46 or 62 except for a rear leaf spring 104. The same components are represented by the same reference symbols to omit their description. In the rear support structure 102, one rear leaf spring 104 is arranged behind the rear coupling bar 42. Similarly to the rear leaf spring 54, the rear leaf spring 104 functions as the rear suspension member that supports the seat cushion 14 at its rear while the seat cushion 14 is suspended from the seat cushion support frame 18. Two right and left rear leaf springs 104 are arranged in an inverted V-shape in front view, and are arranged such that the rear leaf springs 104 are inclined forward in side view, that is, the upper ends are located on a front side with respect to the lower ends.

Figure 23:
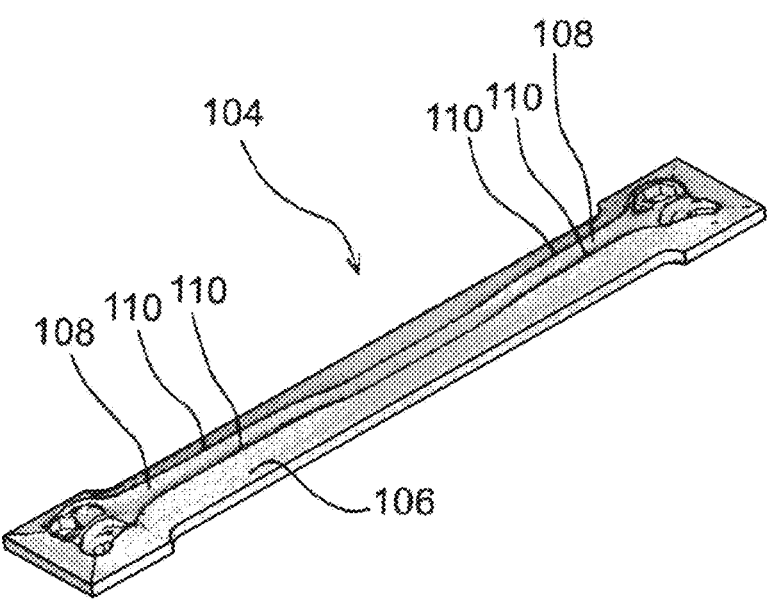
FIG. 23 is a perspective view illustrating an example of a rear leaf spring.
Figure 24:
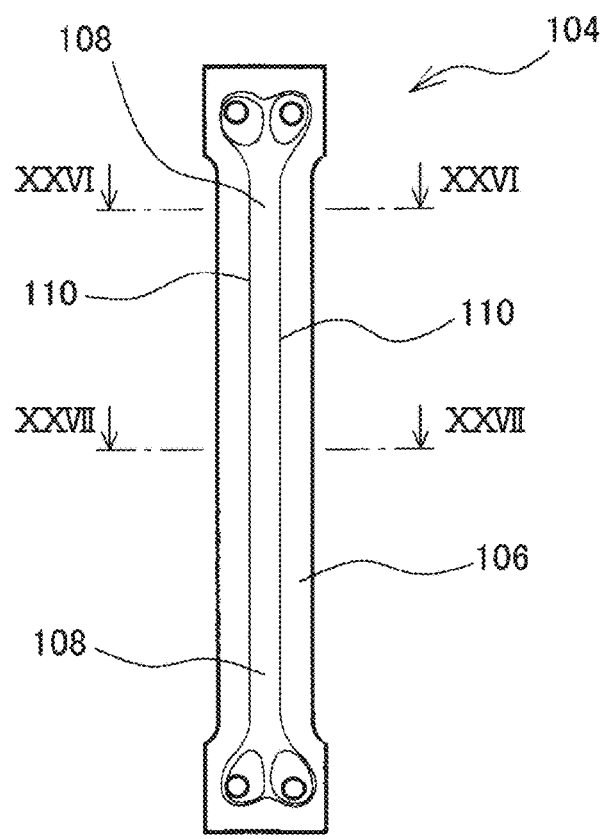
FIG. 24 is a front view of the rear leaf spring illustrated in FIG. 23.
Figure 25:
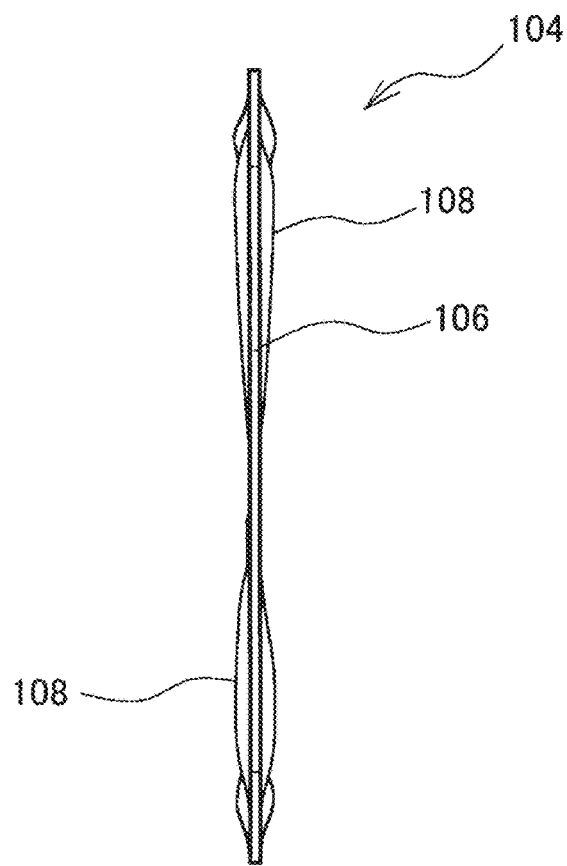
FIG. 25 is a side view of the rear leaf spring illustrated in FIG. 23.
Figure 26:
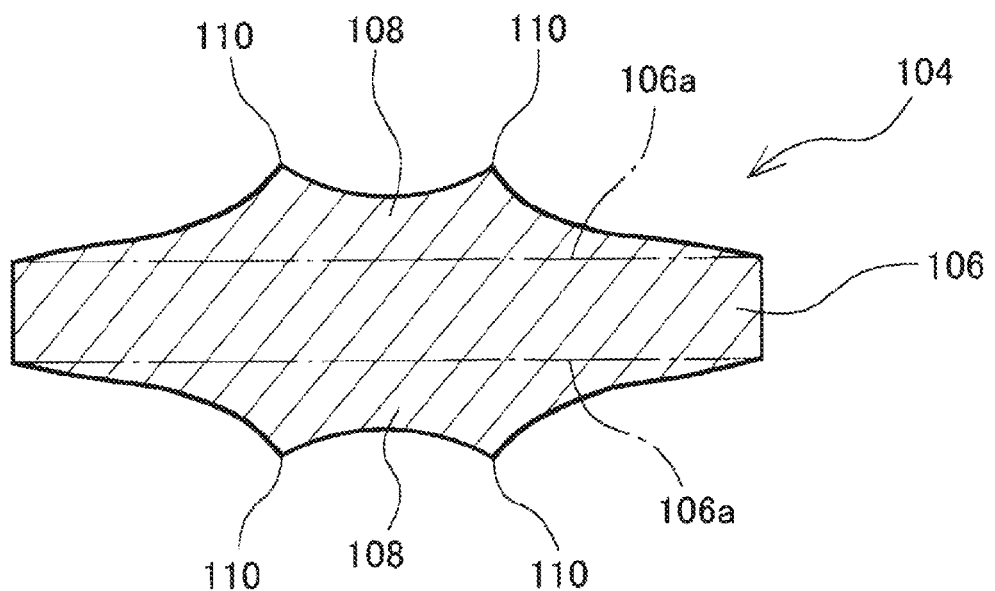
FIG. 26 is a sectional view of the rear leaf spring taken along a line XXVI-XXVI in FIG. 24.
Figure 27:
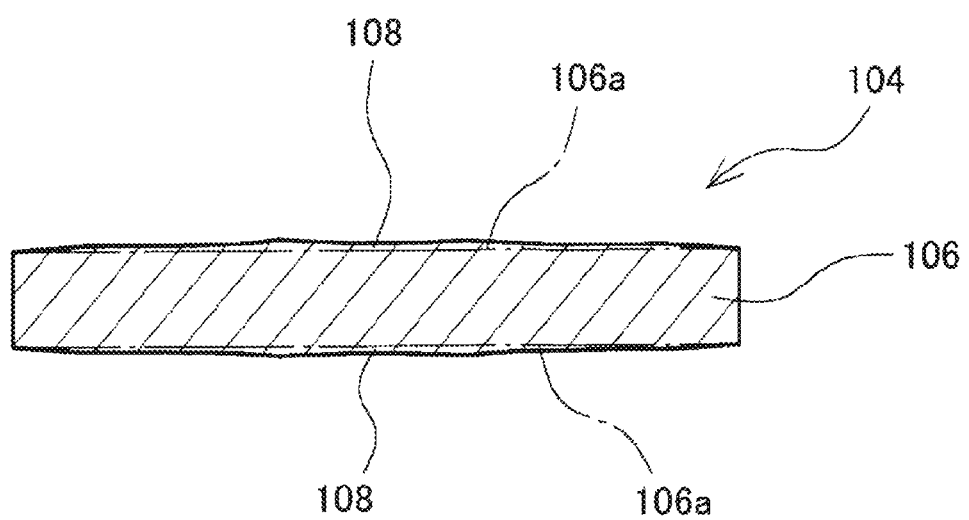
FIG. 27 is a sectional view of the rear leaf spring taken along a line XXVII-XXVII in FIG. 24.

FIG. 23 to FIG. 27 are diagrams illustrating the shape of the rear leaf spring 104. FIG. 23 is a perspective view. FIG. 24 is a front view illustrating the widest surface (plate surface). FIG. 25 is a right-hand side view of FIG. 24. FIG. 26 and FIG. 27 are sectional views taken along lines XXVI-XXVI and XXVII-XXVII in FIG. 24, respectively.

As illustrated in FIG. 23, the rear leaf spring 104 has an elongated rectangular shape. The rear leaf spring 104 includes a base plate 106 and ridges 108. The base plate 106 has a uniform thickness. The ridge 108 projects from the base plate 106, and extends in a longitudinal direction of the rear leaf spring 104. The thickness of the base plate 106 is defined at the thinnest portion of the rear leaf spring 104. The ridge 108 projects from a plate surface 106a orthogonal to a thickness direction. In the rear leaf spring 104, the ridges 108 are formed on both front and back surfaces of the base plate 106, but the ridges 108 may be formed on one surface alone. The height of the ridges 108, that is, the distance from the plate surface 106a to the top is large at both ends in the longitudinal direction of the rear leaf spring 104, and gradually decreases toward the center. By increasing the height of the ridges 108, that is, the thickness of the rear leaf spring 104 at the ends, the strength of each end where a stress concentrates is increased. By reducing the thickness at the center, overall deflection of the rear leaf spring 104 is secured.

As illustrated in FIG. 26, the ridge 108 is provided at the center of the rear leaf spring 104 in its width direction, and the rear leaf spring 104 is thin at both edges in the width direction. Thus, the stress increases at the ridge 108, and decreases at the edges. It may be likely that the edge is cracked. By reducing the stress at the edge, it is possible to reduce the occurrence of a case where the rear leaf spring 104 is torn off due to the crack in the edge. The ridge 108 has two ridge lines 110 extending in parallel along the longitudinal direction. By providing the two ridge lines 110 spaced away from each other in the width direction, torsional stiffness can be increased as compared to a case of one ridge line. The heights of the two ridge lines 110 may be substantially equal.

The rear leaf spring 104 may be made of a fiber reinforced resin. In particular, the rear leaf spring 104 may be made of a carbon fiber reinforced resin. The rear leaf spring 104 may be made of a unidirectional fiber reinforced resin in which reinforcement fibers extend in the longitudinal direction of the rear leaf spring 104.

Figure 28:
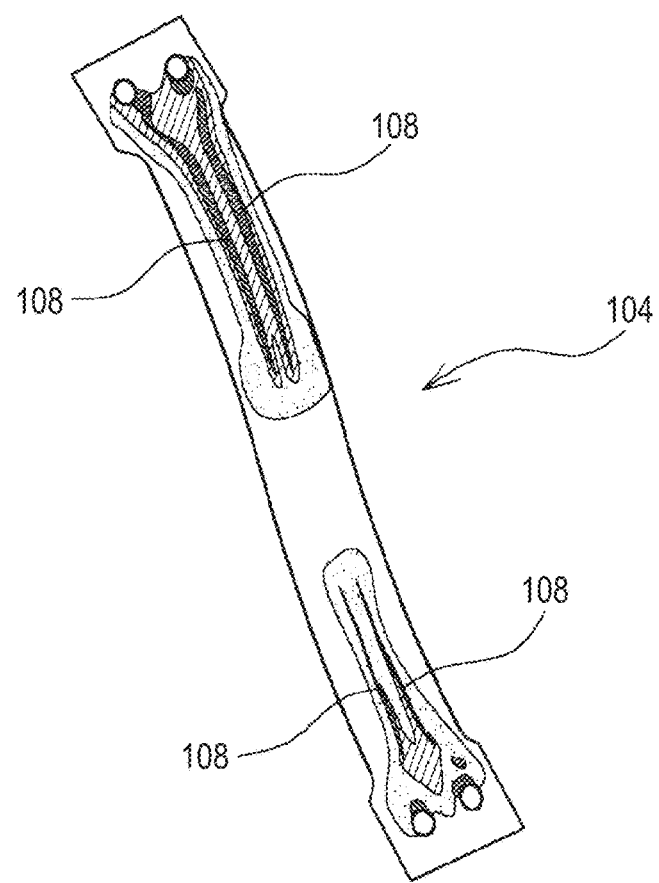
FIG. 28 is a diagram illustrating stress distribution of the rear leaf spring illustrated in FIG. 23.
Figure 29:
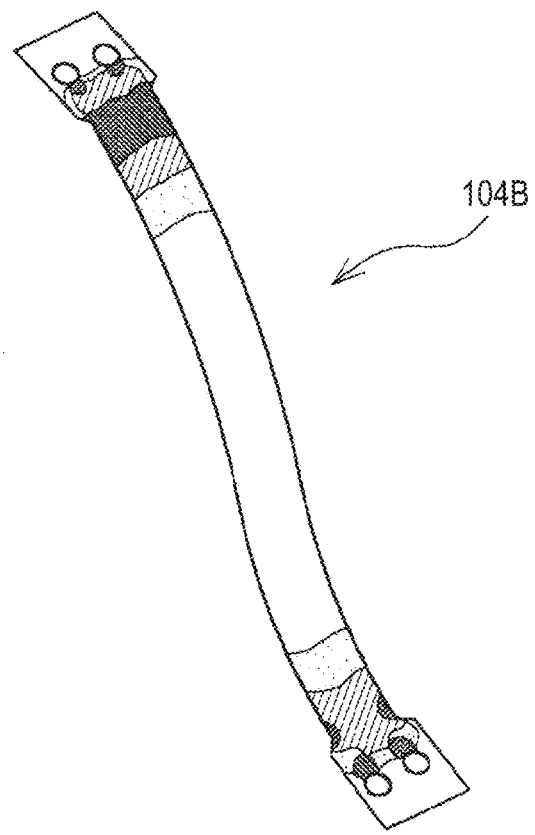
FIG. 29 is a diagram illustrating stress distribution of a rear leaf spring having a uniform thickness.

FIG. 28 is a diagram illustrating distribution of a stress that occurs when the rear leaf spring 104 is deflected. FIG. 29 illustrates, as a comparative example, stress distribution of a rear leaf spring 104B having a uniform thickness. The stress is highest at a cross-hatched portion. The stress decreases in order from a hatched portion to a dotted portion. In the case of a uniform thickness (see FIG. 29), a high stress occurs over the total width of the end. When the ridges 108 are provided, the stress increases at the ridges 108, and decreases at the edge.

Figure 30:
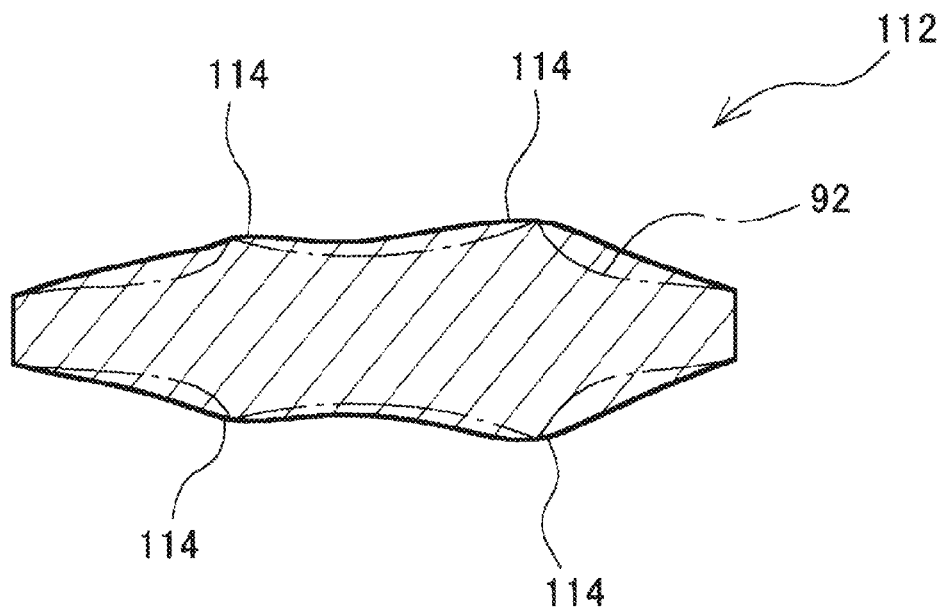
FIG. 30 is a diagram illustrating an example of the sectional shape of the front leaf spring.
Figure 31:
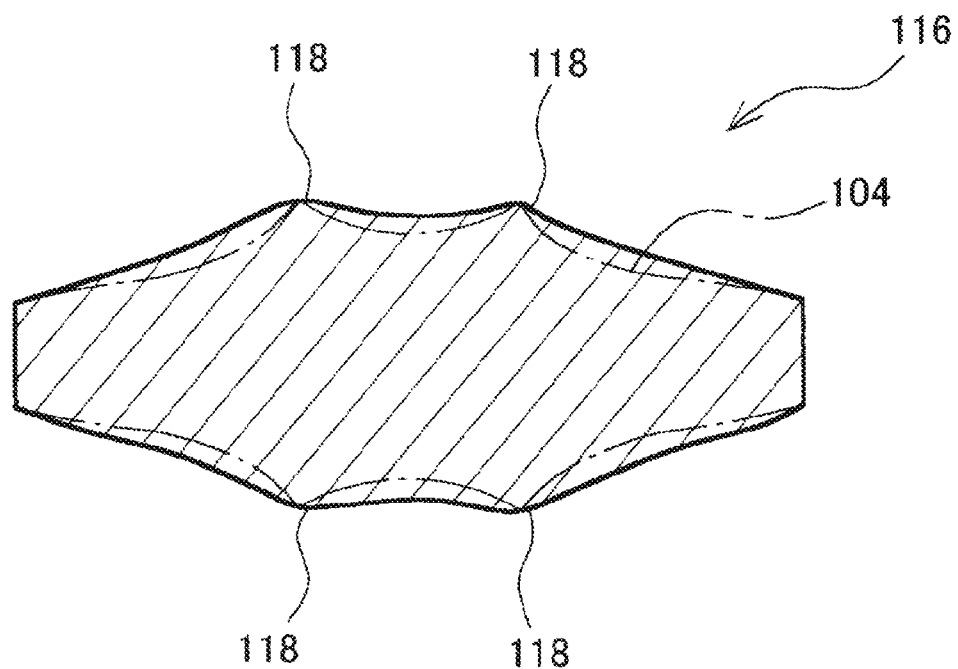
FIG. 31 is a diagram illustrating an example of the sectional shape of the rear leaf spring.

FIG. 30 is a diagram illustrating the sectional shape of a front leaf spring 112. The front leaf spring 112 has the same shape as that of the front leaf spring 92 except for the sectional shape. In the sectional shape of the front leaf spring 92 indicated by long dashed short dashed lines, the ridge lines are formed sharply. In the front leaf spring 112, ridge lines 114 are formed gently. FIG. 31 is a diagram illustrating the sectional shape of a rear leaf spring 116. The rear leaf spring 116 has the same shape as that of the rear leaf spring 104 except for the sectional shape. In the sectional shape of the rear leaf spring 104 indicated by long dashed short dashed lines, the ridge lines are formed sharply. In the rear leaf spring 116, ridge lines 118 are formed gently. When a leaf spring made of a fiber reinforced resin is manufactured by laminating pre-pregs, gentle ridge lines are advantageous.

Each of the front leaf spring and the rear leaf spring may have a shape in which the thickness is uniform in the width direction, large at the ends in the longitudinal direction, and small at the center in the longitudinal direction.

The vehicle seat 10 is a front seat that is slidable in the front-rear direction and of which the angle of the seatback is adjustable. The support structures for the seat cushion and the seatback may also be employed in a slidable rear seat or the like, and may also be applied to a seat such as a rear seat of a sedan without one or both of the slide function and the seatback angle adjusting function.

What is claimed is:

1. A vehicle seat, comprising:
   a seat cushion that supports a hip and thighs of a seated person;
   a seatback that supports an upper body of the seated person from a rear;
   a seat cushion support frame stationarily or slidably attached to a vehicle body;
   rear suspension members provided at two positions spaced away from each other in a lateral direction on an edge of the seat cushion near the seatback, the rear suspension members supporting the seat cushion while the seat cushion is suspended from the seat cushion support frame so that the seat cushion is movable in the lateral direction; and two front suspension members provided at two positions respectively, the two positions being spaced away from each other in the lateral direction, the two positions being ahead of the rear suspension members, and the two front suspension members supporting the seat cushion while the seat cushion is suspended from the seat cushion support frame so that the seat cushion is movable in the lateral direction.

2. The vehicle seat according to claim 1, wherein a distance between upper ends of the rear suspension members is smaller than a distance between lower ends of the rear suspension members.

3. The vehicle seat according to claim 2, wherein
a distance between upper ends of the two front suspension members is smaller than a distance between lower ends of the two front suspension members.

4. The vehicle seat according to claim 3, wherein:
each of the two front suspension members is a leaf spring in which an upper end is fixed to a member on a seat cushion support frame side and a lower end is fixed to a member on a seat cushion side;
the upper end of the leaf spring is located ahead of the lower end of the leaf spring;
the leaf spring has a C-shape open to a rear;
a ridge is formed on a plate surface of the leaf spring so as to project from the plate surface and extend along a longitudinal direction of the leaf spring;
a height of the ridge gradually decreases from an upper end portion and a lower end portion toward a center in the longitudinal direction of the leaf spring;
the ridge has two ridge lines extending in parallel along the longitudinal direction of the leaf spring; and
the height of the ridge is larger on the ridge line located at a rear than the ridge line located at a front.

5. The vehicle seat according to claim 1, wherein:
one of the rear suspension member and the front suspension member or each of the rear suspension member and the front suspension member is a leaf spring;
an upper end of the leaf spring is fixed to a member on a seat cushion support frame side, and a lower end of the leaf spring is fixed to a member on a seat cushion side;
the leaf spring has a thick portion that is provided at least at each end in a longitudinal direction of the leaf spring and the thick portion has a large dimension in a thickness direction at least in part in a width direction of the leaf spring; and
the dimension of the thick portion in the thickness direction gradually decreases from the end toward a center in the longitudinal direction of the leaf spring.

6. The vehicle seat according to claim 1, wherein
the seat cushion support frame includes two side members located on right and left sides and a coupling bar that extends in the lateral direction and couples the side members, and
upper ends of the rear suspension members are fixed to the coupling bar.

7. The vehicle seat according to claim 1, further comprising a seatback support frame coupled to the seat cushion support frame, wherein the seatback is supported on the seatback support frame so as to be swingable in the lateral direction.

8. The vehicle seat according to claim 1, wherein
one of the rear suspension member and the front suspension member or each of the rear suspension member and the front suspension member is a leaf spring, and
one end of the leaf spring is fixed to a member on a seat cushion support frame side.

9. The vehicle seat according to claim 8, wherein the leaf spring is made of a fiber reinforced resin.

10. The vehicle seat according to claim 1, wherein
one of the rear suspension member and the front suspension member or each of the rear suspension member and the front suspension member is a leaf spring,
an upper end of the leaf spring is fixed to a member on a seat cushion support frame side, and a lower end of the leaf spring is fixed to a member on a seat cushion side,
a ridge is formed on a plate surface of the leaf spring so as to project from the plate surface and extend along a longitudinal direction of the leaf spring, and
a height of the ridge gradually decreases from an upper end portion and a lower end portion toward a center in the longitudinal direction of the leaf spring.

11. The vehicle seat according to claim 10, wherein the ridge of the leaf spring has two ridge lines extending in parallel along the longitudinal direction of the leaf spring.

12. A vehicle seat, comprising:
a seat cushion that supports a hip and thighs of a seated person;
a seatback that supports an upper body of the seated person from a rear;
a seat cushion support frame stationarily or slidably attached to a vehicle body;
rear suspension members provided at two positions spaced away from each other in a lateral direction on an edge of the seat cushion near the seatback, the rear suspension members supporting the seat cushion while the seat cushion is suspended from the seat cushion support frame so that the seat cushion is movable in the lateral direction; and
a front suspension member provided at a position ahead of the rear suspension members, the front suspension member supporting the seat cushion while the seat cushion is suspended from the seat cushion support frame so that the seat cushion is movable in the lateral direction.

13. The vehicle seat according to claim 12, wherein the front suspension member is located at a center of the vehicle seat in the lateral direction.

* * * * *